US012079690B2

(12) United States Patent
Jones et al.

(10) Patent No.: US 12,079,690 B2
(45) Date of Patent: Sep. 3, 2024

(54) INTEGRATING A CRYOSTAT THAT HOSTS QUBITS WITH ELECTRONICS FOR CONTROLLING THE QUBITS

(71) Applicant: Rigetti & Co., Inc., Berkeley, CA (US)

(72) Inventors: Glenn Jones, Berkeley, CA (US);
Robert Lion, Redwood City, CA (US);
Michael Rust, Martinez, CA (US);
Stefan William Turkowski, Redwood City, CA (US); Nima Taie-Nobarie, Danville, CA (US); Saniya Vilas Deshpande, Berkeley, CA (US);
Michael Karunendra Selvanayagam, Oakland, CA (US); Damon Stuart Russell, Pasadena, CA (US)

(73) Assignee: Rigetti & Co., Inc., Berkeley, CA (US)

( * ) Notice: Subject to any disclaimer, the term of this patent is extended or adjusted under 35 U.S.C. 154(b) by 328 days.

(21) Appl. No.: 17/384,595

(22) Filed: Jul. 23, 2021

(65) Prior Publication Data
US 2021/0350270 A1    Nov. 11, 2021

Related U.S. Application Data

(63) Continuation of application No. PCT/US2020/015273, filed on Jan. 27, 2020.

(51) Int. Cl.
*G06F 1/20*     (2006.01)
*G06N 10/00*    (2022.01)

(52) U.S. Cl.
CPC .............. *G06N 10/00* (2019.01); *G06F 1/20* (2013.01)

(58) Field of Classification Search
USPC .................................................. 716/100, 138
See application file for complete search history.

(56) References Cited

U.S. PATENT DOCUMENTS

| 4,635,451 A | 1/1987 | Laskaris |
| 10,043,136 B1 | 8/2018 | Abdo |
| (Continued) | | |

OTHER PUBLICATIONS

M. Saffman "Quantum computing with atomic qubits and Rydberg interactions: Progress and challenges", Department of Physics, University of Wisconsin-Madison, 2016 (Year: 2016).*

(Continued)

*Primary Examiner* — Brian Ngo
(74) *Attorney, Agent, or Firm* — Fish & Richardson P.C.

(57) ABSTRACT

A quantum computing system includes a cryostat to support a low-temperature vacuum environment during operation of the quantum computing system; a quantum processor positioned in the cryostat; a first electronic control module external to the cryostat; a second electronic control module within the cryostat; at least one optical transmission line connecting the first electronic control module external to the cryostat with the second electronic control module internal to the cryostat, the optical transmission line being configured to transmit optical signals to and from the second electronic control module during operation of the quantum computing system; and a plurality of signal lines connecting the second electronic control module with the quantum processor, a first subset of the signal lines being configured to transmit microwave signals to and from the quantum processor during operation of the quantum computing system.

26 Claims, 12 Drawing Sheets

(56) References Cited

U.S. PATENT DOCUMENTS

| | | | |
|---|---|---|---|
| 2012/0201268 A1 | 8/2012 | Boyd et al. | |
| 2016/0040288 A1* | 2/2016 | Wu | C23C 16/46 427/255.28 |
| 2017/0178018 A1* | 6/2017 | Tcaciuc | H05K 1/0233 |
| 2021/0350270 A1* | 11/2021 | Jones | G06N 10/40 |

OTHER PUBLICATIONS

Conway Lamb, "Cryogenic Control Beyond 100 Qubits," Thesis for master's degree, University of Sydney, Jul. 2017, Retrieved from URL<https://ses.library.usyd.edu.au/handle/2123/17046> 103 pages.

Guise et al., "In-Vacuum Active Electronics for Microfabricated Ion Traps," Jun. 3, 2014, Retrieved from URL<https://arxiv.org/abs/1403.3662v2> 8 pages.

International Preliminary Report on Patentability in International Appln. No. PCT/US2020/015273, dated Aug. 5, 2021, 11 pages.

International Search Report and Written Opinion in International Appln. No. PCT/US2020/015273, dated May 21, 2020, 14 pages.

Sebastiano et al., "Cryo-CMOS Electronic Control for Scalable Quantum Computing: Invited," DAC Jun. 22, 2017: Proceedings of the 54th Annual Design Automation Conference, No. 13, pp. 1-6 (Abstract Only).

Deng, "An Ultrafast Electrical and Optical Excitation System for Research on Polaritons in Hybrid Cavities for Scalable Quantum Photonics," Final Performance Report, prepared for the Air Force Research Laboratory, dated Feb. 15, 2018, 11 pages.

Extended European Search Report in European Appln No. 20746081.7, dated Mar. 10, 2022, 12 pages.

Sebastiano et al., "Cryo-CMOS Electronic Control for Scalable Quantum Computing," Abstract, Presented at Proceedings of the 54th Annual Design Automation Conference: DAC 2017, Austin, TX, Jun. 18-22, 2017, 6 pages.

\* cited by examiner

INTEGRATING A CRYOSTAT THAT HOSTS QUBITS WITH ELECTRONICS FOR CONTROLLING THE QUBITS

CROSS-REFERENCE TO RELATED APPLICATIONS

This application is a continuation of International Application No. PCT/US2020/015273, filed on Jan. 27, 2020, which claims priority to U.S. Provisional Application Ser. No. 62/797,162, filed on Jan. 25, 2019. The aforementioned patent applications are hereby incorporated by reference in their entireties.

FIELD OF TECHNOLOGY

The present technology relates to integrating a cryostat hosting qubits with electronics for controlling the qubits.

BACKGROUND

A quantum computing system based on a circuit of superconducting qubits typically requires both a vacuum-enclosed cryostat to achieve superconducting material temperatures (e.g., implemented as a dilution refrigerator) and classical control electronics (e.g., for generating analog/radio frequency (RF) pulses, etc.) to be operated. These two parts of the quantum computing system are separate components in conventional implementations of the quantum computing system. As the number qubits is scaled from 10s to 100s to 1000s, the number of control lines which must be routed through the vacuum housing of the cryostat to the qubits from a control rack, which hosts the classical control electronics, grows at approximately twice the number of qubits. This makes an interface between the cryostat and the control rack a bottleneck, because all the control lines carrying the RF pulses generated by the classical control electronics need to pass through a wall of a vacuum chamber of the cryostat, also referred to as the vacuum jacket.

Brute-force scaling simply calls for increasing the number of hermetic RF ports on the cryostat, which is costly, time-intensive, and, ultimately, limited with respect to the physical area available on isothermal plates of the cryostat. This also requires that large amounts of RF cabling be provided between the cryostat and the control rack.

SUMMARY

The disclosed technologies solve the foregoing technical problems by more tightly integrating parts of the control rack with the cryostat, thus reducing (e.g., minimizing) the number of connections that are made between the cryostat and the rack. This is done by removing analog and RF functionality from the control rack and placing it inside the vacuum chamber of the cryostat, hence reducing (e.g., minimizing) the number of connections made through the vacuum jacket of the cryostat. As part of the disclosed technologies, the control electronics and cryostat are integrated together by placing a portion of the control electronics into the cryostat. This causes an increase in signal bandwidth going in and out of the cryostat.

Control electronics to be placed in the cryostat include analog-to-digital converters (ADCs), digital-to-analog converters (DACs), field-programmable gate arrays (FPGAs), transmitters (TXs) such as RF TXs, and receivers (RXs) such as RF RXs. In some implementations, these are integrated on modular printed circuit boards (PCBs), also referred to as cards, as discrete off-the-shelf chips, or as custom application-specific integrated circuits (ASICs). Because this is a subset of the functionality of the control electronics, each such modular PCB is suitably implemented as a small board allowing for many of these boards to be placed in the cryostat, e.g., in some embodiments the number of qubits controlled per PCB may be between 2 qubits controlled by 5 PCBs and greater than 100 qubits controlled by a single PCB. In the case of greater than 100 qubits controlled by a single PCB, the PCB may in some embodiments include an ASIC. More specific examples include: two PCBs to control a pair of qubits, one PCB to control two qubits, one PCB to control more than one pair of qubits, one PCB to control more than 10 qubits, etc. Digital signals transmitted to the DACs, and from the ADCs, on such modular PCBs are converted from, or to, optical signals on an optical bus connected to each board. This optical bus, which contains many qubit control signals, is suitably routed out of the cryostat through a small number of hermetic optical-fiber ports. This greatly reduces the interface of the cryostat with the portion of the control electronics disposed outside of the cryostat.

Further inside the cryostat, at the other end of the control electronics disposed inside the cryostat, RF flex cables can be used to connect the RF signals generated by the modular PCBs to the qubits. Because there are of order 100s to 1000s of qubits hosted inside the cryostat, a corresponding number of signal lines are needed through which control signals are delivered from the control electronics disposed inside the cryostat to a qubit package enclosing the circuit of superconducting qubits. The disclosed technologies allow for such RF connections to be provided inside the vacuum enclosure of the cryostat. Among other things, the disclosed integration approach is more scalable compared to the conventional integration approach, because placing 100s-1000s of RF connections integrated inside the vacuum enclosure can be done using compliant-joint interfaces with the RF flex cables.

As noted above, a portion of control electronics is integrated into the vacuum jacket of the cryostat and placed on a surface of the vacuum jacket in a modular fashion. Because this portion of the control electronics is placed in vacuum, an appropriate cooling mechanism is used to sink the heat generated by each card, as described in detail below.

Various aspects of the invention are summarized below.

In general, in a first aspect, the invention features a quantum computing system including a cryostat with a vacuum chamber, the cryostat being configured to support a low-temperature vacuum environment during operation of the quantum computing system. The quantum computing system further includes a quantum computer processor positioned in the vacuum chamber, a first electronic control module external to the vacuum chamber, a second electronic control module within the vacuum chamber, an optical transmission line connecting the first electronic control module with the second electronic control module, the optical transmission line being configured to transmit optical signals to and from the second electronic control module during operation of the quantum computing system, and a number of signal lines connecting the second electronic control module with the quantum computer processor, a first subset of the signal lines being configured to transmit microwave signals to and from the quantum computer processor during operation of the quantum computing system.

Implementations of the quantum computing system can include one or more of the following features and/or features of other aspects. For example, the signal lines of the first subset can be configured to transmit the microwave signals having frequencies between 300 MHz and 300 GHz. In some embodiments, the signal lines of the first subset are configured to transmit the microwave signals having frequencies less than 20 GHz, e.g., less than 10 GHz.

The second subset of the signal lines can be configured to transmit slow electrical signals in a frequency range between DC and 300 MHz to the quantum computer processor during operation of the quantum computing system.

In general, in another aspect, the invention features a quantum computing system that includes a cryostat with a vacuum chamber, the cryostat being configured to support a low-temperature vacuum environment during operation of the quantum computing system. The system further includes a quantum computer processor positioned in the vacuum chamber, a first electronic control module external to the vacuum chamber, a second electronic control module within the vacuum chamber, the second electronic control module including one or more digital-to-analog converters configured to receive digital signals and provide analog signals based on the digital signals during operation of the quantum computing system, a transmission line connecting the first electronic control module external to the vacuum chamber with the second electronic control module internal to the vacuum chamber, the transmission line being configured to transmit digital signals to and from the second electronic control module during operation of the quantum computing system, and a plurality of signal lines connecting the second electronic control module with the quantum computer processor, the signal lines being configured to transmit analog signals to the quantum computer processor during operation of the quantum computing system.

Implementations of the quantum computing system can include one or more of the following features and/or features of other aspects. For example, the transmission line can be an optical transmission line.

In either or both of the foregoing aspects, the second electronic control module can include a de-multiplexing module for receiving a multiplexed optical signal from the optical transmission line and providing de-multiplexed optical signals for producing corresponding microwave signals to the signal lines.

In general, in another aspect, the invention features a quantum computing system including a cryostat with a vacuum chamber, the cryostat being configured to support a low-temperature vacuum environment during operation of the quantum computing system. The system further includes a quantum computer processor positioned in the vacuum chamber, a first electronic control module external to the vacuum chamber, a second electronic control module within the vacuum chamber including a signal de-multiplexer, an optical transmission line connecting the first electronic control module external to the vacuum chamber with the second electronic control module internal to the vacuum chamber, the optical transmission line being configured to transmit multiplexed optical signals to and from the second electronic control module during operation of the quantum computing system, and a plurality of signal lines connecting the second electronic control module with the quantum computer processor, the signal lines being configured to transmit corresponding de-multiplexed signals to, and corresponding signals from, the quantum computer processor during operation of the quantum computing system.

Implementations of the quantum computing system can include one or more of the following features and/or features of other aspects. For example, in the systems of any of the foregoing aspects, the vacuum chamber can include an optical port through which the optical transmission line connects the first electronic control module external to the vacuum chamber with the second electronic control module internal to the vacuum chamber.

In general, in yet another aspect, the invention features a quantum computing system that includes a cryostat with a vacuum chamber, the cryostat being configured to support, during operation of the quantum computing system, a low-temperature vacuum environment. The system further includes a quantum computer processor positioned in the vacuum chamber, a controller within the vacuum chamber, the controller configured to produce digital control signals for, and process digital readout signals of, the quantum computer processor, one or more converters within the vacuum chamber, the one or more converters configured to receive the digital control signals and provide analog control signals based on the received digital control signals, and receive analog readout signals and provide the digital readout signals based on the received analog readout signals. The system also includes a network cable connecting the controller internal to the vacuum chamber with a job-handler server external to the cryostat, the network cable being configured to transmit, through a network, network packets to and from the controller during operation of the quantum computing system, and a plurality of signal lines connecting the one or more converters with the quantum computer processor, the signal lines being configured to transmit analog signals to the quantum computer processor during operation of the quantum computing system.

Implementations of the quantum computing system can include one or more of the following features and/or features of other aspects. For example, the vacuum chamber can include a network port through which the network cable) connects the controller internal to the vacuum chamber with the job-handler server external to the cryostat.

In any of the foregoing systems, the second electronic control module can include a DAC/ADC array to receive digital signals from, and produce digital signals for transmission to, the first electronic control module external to the cryostat, a mixer array to receive MW signals from, and produce MW signals for transmission to, the quantum computer processor, and a MW oscillator operatively coupled with the mixer array to produce the MW signals for transmission to the quantum computer processor, and the DAC/ADC array to produce the digital signals for transmission to the first electronic control module external to the cryostat.

In any of the foregoing systems, the second electronic control module can include a DAC/ADC array to receive digital signals from, and produce digital signals for transmission to, the first electronic control module external to the cryostat, and receive MW signals from, and produce MW signals for transmission to, the quantum computer processor.

In general, in another aspect, the invention features a quantum computing system that includes a cryostat with a vacuum chamber, the cryostat being configured to support, during operation of the quantum computing system, a cryogenic-temperature vacuum environment in a cryogenic-temperature partition of the vacuum chamber, wherein temperatures inside the vacuum chamber are higher outside, than inside, the cryogenic-temperature partition, a quantum computer processor positioned in the cryogenic-temperature partition of the vacuum chamber, an electronic control module external to the cryostat, a MW-signal multiplexer/de-multiplexer (MUX/deMUX) within the vacuum chamber and outside the cryogenic-temperature partition thereof, the MW-signal MUX/deMUX being arranged in thermal contact with an inner wall surface of a wall of the vacuum chamber, a MW-transmission line connecting the electronic control module external to the cryostat with the MW-signal MUX/deMUX internal to the vacuum chamber outside its cryogenic-temperature partition, the MW-transmission line being configured to transmit multiplexed MW signals to and from the MW-signal MUX/deMUX during operation of the quantum computing system, and a plurality of signal lines connecting the MW-signal MUX/deMUX internal to the vacuum chamber outside its cryogenic-temperature partition with the quantum computer processor internal to the cryogenic-temperature partition of the vacuum chamber, the signal lines being configured to transmit corresponding de-multiplexed MW signals to, and corresponding MW signals from, the quantum computer processor during operation of the quantum computing system.

Implementations of the quantum computing system can include one or more of the following features and/or features of other aspects. For example, the vacuum chamber can include a MW port through which the MW-transmission line connects the MW-signal MUX/deMUX internal to the vacuum chamber with the electronic control module external to the cryostat.

The foregoing systems can include one or more busbars coupled with the inner wall surface of the wall of the vacuum chamber. The vacuum chamber can include one or more electrical feedthroughs corresponding to the one or more busbars.

The foregoing systems can include a flexible circuit including the signal lines.

The cryostat of any of the foregoing systems can be a helium dilution refrigerator.

The quantum computer processor and the second electronic control module of foregoing systems can be separated within the vacuum chamber (by one or more baffles.

The quantum computer processor of the foregoing systems can be a superconducting quantum computer processor.

The second electronic control module of the foregoing systems can include one or more components that produce heat during operation, and the one or more components are thermally coupled to an inner wall surface of a wall of the vacuum chamber. The inner wall surface can include a plurality of planar facets. The second electronic control module can include one or more electronics boards each mounted in thermal contact with a corresponding one of the planar facets.

The foregoing systems can include a cooling system including a wall of the vacuum chamber, the wall having an inner wall surface and an outer wall surface, and a heat exchanger thermally coupled to the outer wall surface. The components of the second electronic control module can be thermally coupled to the inner wall surface, such that the cooling system removes, during operation of the quantum computing system, at least a portion of heat produced by the components of the second electronic control module. The cooling system can include a radiation shield, the radiation shield being disposed in the vacuum chamber and spaced apart from the inner wall surface to encompass the components of the second electronic control module, such that a temperature of the components of the second electronic control module encompassed by the radiation shield is maintained within a target temperature range higher than cryogenic temperatures. The target temperature range can be 298K to 263K. The heat exchanger of the cooling system can include a liquid-cooling loop. The heat exchanger of the cooling system can include fins disposed on the outer wall surface, and one or more fans to circulate air over the fins.

In any of the foregoing systems, the vacuum chamber can be configured to support, during operation of the quantum computing system, a cryogenic-temperature vacuum environment in a cryogenic-temperature partition of the vacuum chamber, wherein temperatures inside the vacuum chamber are higher outside, than inside, the cryogenic-temperature partition, the quantum computer processor can be positioned in the cryogenic-temperature partition of the vacuum chamber and the second electronic control module can be positioned within the vacuum chamber and outside the cryogenic-temperature partition thereof, the second electronic control module being arranged in thermal contact with an inner wall of the vacuum chamber. The temperature inside the cryogenic-temperature partition can be lower than 50K. The cryogenic-temperature partition of the vacuum chamber can have an operational-temperature sub-partition. The temperature inside the operational-temperature sub-partition can be lower than 100 mK. The cryogenic-temperature partition can include an array of MW ports through which the signal lines connect the second electronic control module with the quantum computer processor.

The optical transmission line in the foregoing systems can be the only transmission line connecting the first electronic control module external to the vacuum chamber with the second electronic control module internal to the vacuum chamber.

In general, in another aspect, the invention features a quantum computing system that includes a chamber configured to support a stable environment during operation of the quantum computing system, a quantum computer processor positioned in the chamber, a first electronic control module external to the chamber, a second electronic control module within the chamber, an optical transmission line connecting the first electronic control module external to the chamber with the second electronic control module internal to the chamber, the optical transmission line being configured to transmit optical signals to and from the second electronic control module during operation of the quantum computing system, and a plurality of signal lines connecting the second electronic control module with the quantum computer processor, a first subset of the signal lines being configured to transmit control signals to and from the quantum computer processor during operation of the quantum computing system.

Implementations of the quantum computing system can include one or more of the following features and/or features of other aspects. For instance, the chamber can be a vacuum chamber. The quantum computer processor can be an ion trap quantum computer processor.

The foregoing systems can include at least one direct signal line connecting the first electronic control module to the quantum computer processor, the at least one direct signal line bypassing the second control module.

In some embodiments, the transmission line (e.g., optical transmission line) of the foregoing systems is one of a plurality of transmission lines connecting the first electronic control module external to the chamber with the second electronic control module internal to the chamber. The quantum computer processor can include N total qubits and the plurality of transmission line includes a total of k transmission lines, where N>>k.

In general, in another aspect, the invention features a method that includes: maintaining an environment in a chamber containing a quantum computer processor sufficiently stable for operation of the quantum computer processor; transmitting, via one or more transmission lines while maintaining the environment, multiplexed signals from a first electronic control module external to the chamber to a second electronic control module internal to the vacuum chamber; demultiplexing the multiplexed signals using the second electronic control module while maintaining the environment; transmitting, via a plurality of signal lines while maintaining the environment, microwave signals from the second electronic control module to the quantum computer processor; and operating the quantum computer processor based on the microwave signals.

Implementations of the method can include one or more of the following features and/or features of other aspects. For example, the method can include receiving, via the signal lines while maintaining the environment, microwave signals from the quantum computer processor at the second electronic control module. The method can also include multiplexing signals using the electronic control module while maintaining the environment based on the microwave signals from the quantum computer processor. In some embodiments, the method includes transmitting, via the one or more transmission lines while maintaining the environment, multiplexed signals from second electronic control module internal to the chamber to the first electronic control module external to the vacuum chamber.

The multiplexed signals from the first electronic control module to the second electronic control module can be optical signals. The demultiplexing can provide demultiplexed optical signals and producing microwave signals corresponding to the demultiplexed optical signals.

The quantum computer processor can be a superconducting quantum computer processor.

Maintaining the sufficiently stable environment can include maintaining a vacuum environment. Alternatively, or additionally, maintaining the sufficiently stable environment can include maintaining a low-temperature environment.

In general, in yet a further aspect, the invention features a method that includes: maintaining a vacuum, low temperature environment in a chamber containing a quantum computer processor sufficiently stable for operation of the quantum computer processor; transmitting, via one or more optical transmission lines while maintaining the environment, optical signals from a first electronic control module external to the chamber to a second electronic control module internal to the vacuum chamber; producing, at the second electronic control module while maintaining the environment, microwave signals in response to the optical signals received from the first electronic control module; transmitting, via a plurality of signal lines while maintaining the environment, microwave signals from the second electronic control module to the quantum computer processor; and operating the quantum computer processor based on the microwave signals. Implementations of the method can include features of other aspects.

In general, in another method, the invention features a method that includes: maintaining an environment in a chamber containing a quantum computer processor sufficiently stable for operation of the quantum computer processor; transmitting, via one or more transmission lines while maintaining the environment, digital signals from a first electronic control module external to the chamber to a second electronic control module internal to the vacuum chamber; converting, at the second electronic control module while maintaining the environment, the digital signals to analog signals; transmitting, via a plurality of signal lines while maintaining the environment, analog signals from the second electronic control module to the quantum computer processor; and operating the quantum computer processor based on the analog signals. Implementations of the method can include features of other aspects.

In general, in a further aspect, the invention features a method that includes: maintaining an environment in a chamber containing a quantum computer processor sufficiently stable for operation of the quantum computer processor; transmitting, via a network cable while maintaining the environment, network packets from a job-handler server external to the chamber to a controller internal to the vacuum chamber; converting, at the controller while maintaining the environment, digital control signals from the network packets to analog control signals; transmitting, via a plurality of signal lines while maintaining the environment, analog control signals from the controller to the quantum computer processor; and operating the quantum computer processor based on the analog control signals. Implementations of the method can include features of other aspects.

In general, in yet a further aspect, the invention features a method that includes: maintaining an environment in a chamber containing a quantum computer processor sufficiently stable for operation of the quantum computer processor; transmitting, via one or more optical transmission lines while maintaining the environment, optical signals from a first electronic control module external to the chamber to a second electronic control module internal to the vacuum chamber; producing, at the second electronic control module while maintaining the environment, microwave signals in response to the optical signals received from the first electronic control module; transmitting, via a plurality of signal lines while maintaining the environment, microwave signals from the second electronic control module to the quantum computer processor; and operating the quantum computer processor based on the microwave signals. Implementations of the method can include features of other aspects.

Particular aspects of the disclosed technologies can be implemented to realize one or more of the following potential advantages. The control electronics will be kept in a stable environment (e.g. stable temperature), thus providing further stability to the analog/RF signals. Grounding of the control electronics will be improved by tying an electrical ground reference of the control electronics to the cryostat's ground. And, ultimately, the number of control lines can be scaled more efficiently, allowing more superconducting qubits to be integrated into the quantum computing system. As such, the disclosed technologies can lead to higher qubit density by allowing for fewer RF lines to leave the cryostat, e.g., by replacing the RF lines with a single optical I/O line, only. Further, because the control electronics are placed in a vacuum environment, they are less susceptible to temperature variations in the external environment. Furthermore, the disclosed technologies can reduce a number of, and size of each of, ground loops. For instance, the control electronics can be grounded directly to the cryostat, which minimizes ground loops forming. Fewer ground loops can increase qubit lifetimes.

BRIEF DESCRIPTION OF FIGURES

Like symbols in different figures indicate like elements.

Figure 1A:
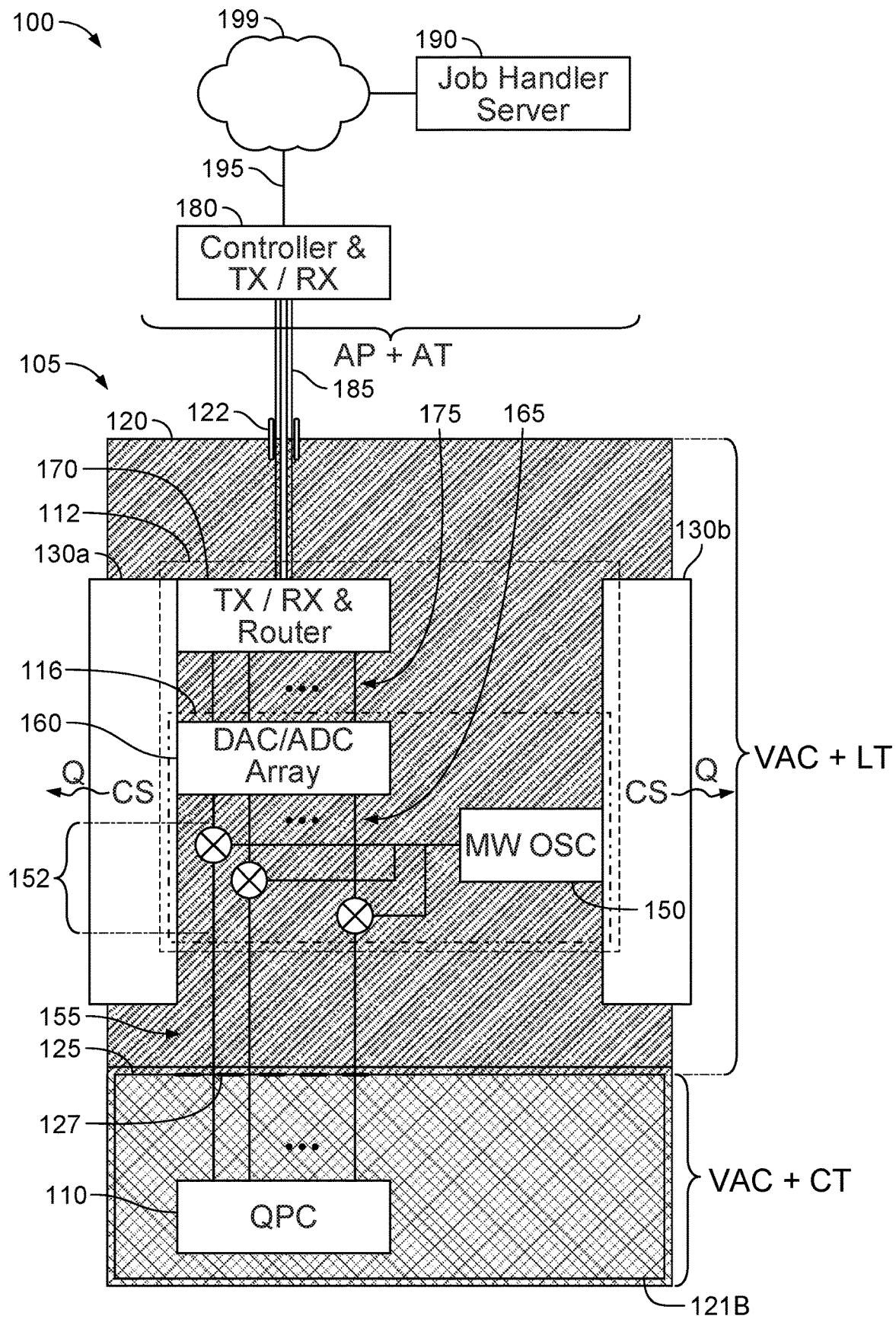
FIG. 1A shows a schematic representation of an example of a quantum computer system, which includes a cryostat, a quantum processor positioned in the cryostat, a first portion of controller circuitry disposed outside the cryostat to provide digital control signals, a single digital transmission line passing through a vacuum seal of the cryostat, a second portion of the controller circuitry disposed inside the cryostat to provide analog control signals corresponding to the digital control signals received through the single digital transmission line, the second portion of the controller circuitry cooled to a low temperature closer to an ambient temperature outside the cryostat than an operational temperature of the quantum processor, and multiple analog transmission lines through which the quantum processor receives the analog control signals.

The details of one or more implementations of the technologies described herein are set forth in the accompanying drawings and the description below. Other features, aspects, and advantages of the disclosed technologies will become apparent from the description, the drawings, and the claims.

DETAILED DESCRIPTION

In one approach for reducing the number of interconnects required to the outside of a cryostat, all control electronics are disposed inside the cryostat's vacuum shell, such that outside computers which are part of a quantum computing system communicate with the control electronics through a conventional 10-100 Gbit/s Ethernet connection over optical fiber. In this approach, control electronics modules disposed inside the cryostat include logic for executing a quantum program, as well as an internal network to exchange classical data between processors directly interfaced to each qubit. The logic can include the processor that sequences and schedules RF waveforms that are output by DACs also disposed inside the cryostat, low-speed control electronics to produce bias voltages, and DSP logic for processing qubit readout signals to determine the state of a qubit when a readout occurs. In this manner, real-time logic and waveform generation are performed inside the cryostat, while being configured to communicate with the outside computers through the conventional optical link, where the optical link can have a modest bandwidth, in some embodiments.

In another approach for reducing the number of interconnects required to the outside of a cryostat, control logic is disposed outside the cryostat, where it produces digital waveform data. Here, raw waveform data is suitably encoded on ultra-wide-bandwidth optical signals, which can in turn be multiplexed onto a small number of optical fibers and sent into the cryostat. Inside the cryostat, the optical signals are de-multiplexed and the raw waveform data sent directly to DACs also disposed inside the cryostat. In this manner, the control logic is outside the cryostat from where it sends high-bandwidth raw digital data, encoding waveforms over optical links to be directly translated into digital values to be provided to the DACs.

Electronics disposed inside the cryostat, which are used for either of the noted options, will likely dissipate 1-10 watts per qubit. In this manner, for 1000 qubits, heat of order 10 kW must be removed from these electronics. As part of the disclosed technologies, the electronics disposed inside the cryostat are thermally coupled to the vacuum jacket, such that the vacuum jacket itself forms a heat-sink. The vacuum jacket is configured, in some implementations described in detail below, to support tubing, which is part of a closed-loop cooling system, for transferring the heat to an external radiator unit. The surface area available for existing large cryostats could easily be 3 $m^2$, so several 10s of kW of heat could reasonably be dissipated in this manner.

Signals can be distributed inside the cryostat, from a stage of the cryostat where the control electronics are disposed, to the colder stages of the cryostat, using RF flex, which is scalable to 1000 qubits and beyond.

To implement the disclosed technologies, a vacuum jacket of the cryostat is suitably fabricated to accommodate the technologies described herein. Additionally, in some implementations, components of the control electronics, including ASICs and optical transceivers, are custom designed, while in other implementations, these components are selected off-the-shelf. Also, integrated flex cables are suitably used to form RF connections inside the cryostat between the control electronics and the superconducting qubits.

Various aspects of the foregoing technologies will be described in detail below.

FIG. 1A shows an example of a quantum computer system 100, which includes a cryostat 105, a quantum processor 110 (referred here, interchangeably, as a superconducting quantum computer processor or quantum processing cell (QPC)) positioned in the cryostat 105, a first portion of controller circuitry 180 (referred here, interchangeably, as the first electronic control module or control systems rack) disposed outside the cryostat 105 to provide digital control signals, a single digital transmission line 185 (e.g., an optical transmission line or an electromagnetic transmission line) passing through a vacuum seal of the cryostat 105, a second portion of the controller circuitry 112 (referred here, interchangeably, as the second electronic control module) disposed inside the cryostat 105 to provide analog control signals (at MW (microwave) frequencies) corresponding to the digital control signals received through the single digital transmission line 180, the second portion of the controller circuitry 112 cooled to a low temperature (LT~50-298K) closer to an ambient temperature (AT~298K) outside the cryostat 105 than an operational temperature (OT<40 mK) of the quantum processor 110, and multiple analog transmission lines 155 (here implemented as MW transmission lines) through which the quantum processor 110 receives the analog control signals.

Note that the term "single digital transmission line" 185 as used in this disclosure means in some embodiments 1, 2, . . . , or up to k instances of the digital transmission line 185, where $1 \leq k << N$. Here, N is the number of qubits hosted inside the cryostat 105, which is typically a number of order 100s to 1000s. Further, the requirement in some embodiments that k be much, much smaller than N means that k can be of order thousandth to hundredth parts of N (e.g., N can be 100 k or more, 500 k or more, 1,000 k or more, 5,000 k or more, 10,000 k or more). Furthermore, in some embodiments k is no larger than tenth parts of N. For example, in implementations which use k=2 instances of the digital transmission line 185, the additional instance can be configured as a backup line. As another example, $2 \leq k << N$ instances of the digital transmission line 185 can be used to increase the bandwidth of data transmissions between components disposed outside the cryostat 105 and components disposed inside the cryostat 105.

The first electronic control module 180 includes controller circuitry and transceiver (TX/RX) circuitry. Further, the first electronic control module 180 is communicatively coupled with (i) a job handler server 190, using network connection 195 through a network 199 (like either the Internet, or a private local area network/wide area network (LAN/WAN)), and (ii) the second electronic control module 112, using the single digital transmission line 185 through an optical port 122. The optical port 122 is configured to allow the single digital transmission line 185 traverse the vacuum jacket of the cryostat 105 from ambient temperature and pressure outside the cryostat 105 to low temperature (LT) and vacuum (VAC) inside the cryostat 105. In some implementations, the optical port 122 is configured as a fiber-optic port. In some implementations, the optical port 122 is configured as a fiber-optic feedthrough. In some implementations, the optical port 122 is configured as a window port through which light signals are passed.

The first electronic control module 180 is configured to (i) receive, from the job handler server 190, code/instructions for a quantum calculation to be performed by the quantum processor 110, (ii) produce a digital version of control signals for addressing qubits of the quantum processor 110, and (iii) provide the digital control signals to the second electronic control module 112. The first electronic control module 180 is further configured to (i) receive, from the second electronic control module 112, a digital version of the quantum processor 110's readout signals, (ii) parse the digital readout signals to extract results of the quantum calculation performed by the quantum processor 110, and (iii) provide the results to the job handler server 190.

The second electronic control module 112 includes TX/RX & Router circuitry 170 and DAC/ADC circuitry 116. The TX/RX & Router circuitry 170 is coupled with the first electronic control module 180 using the single digital transmission line 185 through the optical port 122. The TX/RX & Router circuitry 170 is configured to (i) receive multiplexed digital control signals from the first electronic control module 180, and (ii) de-multiplex the multiplexed digital control signals and provide them to the DAC/ADC circuitry 116. The TX/RX & Router circuitry 170 is further configured to (i) receive, from the DAC/ADC circuitry 116, a digital version of readout signals, and (ii) multiplex the digital readout signals and provide them to the first electronic control module 180. The DAC/ADC circuitry 116 is connected with (i) the TX/RX & Router circuitry 170, using multiple digital transmission lines 175, and (ii) the quantum processor 110, using the multiple analog transmission lines 155 through an array of MW ports 127. The array of MW ports 127 is configured to allow the analog transmission lines 155 traverse at least one plate 121B of the cryostat 105 from low temperature outside a cryogenic-temperature partition 125 of the cryostat 105 to cryogenic temperature (CT) inside the cryogenic-temperature partition 125. In the example shown in FIG. 1A, the DAC/ADC circuitry 116 includes a DAC/ADC array 160, a microwave oscillator (MW OSC) 150 and a mixer array 152. The mixer array 152 is connected to the DAC/ADC array 160 using analog connectors 165, and each of the mixers of the array 152 is connected to the MW oscillator 150. The DAC/ADC circuitry 116 is configured to (i) receive digital control signals, and (ii) convert the digital control signals to analog control signals at MW frequencies, and (iii) provide the MW control signals to the quantum processor 110. The DAC/ADC circuitry 116 is further configured to (i) receive analog readout signals at MW frequencies from the quantum processor 110, (ii) convert the MW readout signals to digital readout signals, and (iii) provide the digital readout signals to the TX/RX & Router circuitry 170.

In some implementations not shown in FIG. 1A, the second electronic control module 112 lacks the DAC/ADC array 160. Here, the mixer array 152 is connected directly to the TX/RX & Router circuitry 170 through the analog connectors 165, so the multiple digital transmission lines 175 also are omitted. In this case, the TX/RX & Router circuitry 170 is coupled with the first electronic control module 180 using a single analog line through an analog port. The TX/RX & Router circuitry 170 is configured to (i) receive multiplexed analog control signals from the first electronic control module 180, and (ii) de-multiplex the multiplexed analog control signals and provide them directly to the mixer array 152. The TX/RX & Router circuitry 170 is further configured to (i) receive, from the mixer array 152, an analog version of readout signals, and (ii) multiplex the analog readout signals and provide them to the first electronic control module 180. The mixer array 152 is configured to (i) receive analog control signals, and (ii) convert, in conjunction with MW OSC 150, the analog control signals to MW control signals, and (iii) provide the MW control signals to the quantum processor 110. The mixer array 152 is further configured to (i) receive MW readout signals from the quantum processor 110, (ii) convert, in conjunction with MW OSC 450, the MW readout signals to analog readout signals, and (iii) provide the analog readout signals to the TX/RX & Router circuitry 170.

Figure 1B:
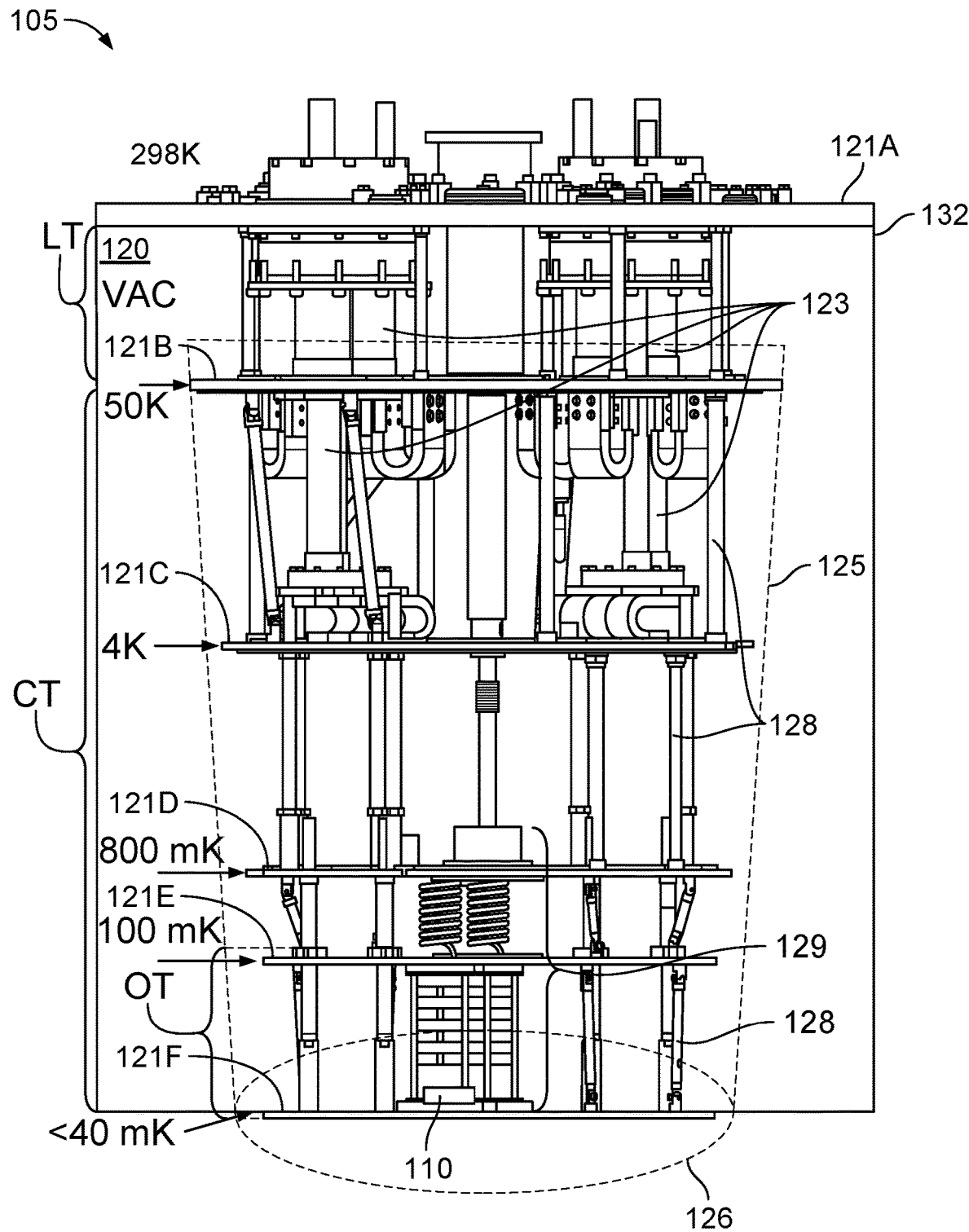
FIG. 1B shows a perspective view of the top vacuum flange and interior configuration of an example of a cryostat used by any of the quantum computer systems disclosed herein.

Referring now to FIG. 1B, which shows an example of a cryostat 105 used by any of the quantum computer systems disclosed herein, the cryostat 105 includes a vacuum chamber 120 separated from the ambient environment through a wall 132 and a vacuum flange 132. The vacuum chamber 120 includes multiple plates 121B, ..., 121F and support posts 128 which hold the plates 121B, ..., 121F at predetermined separations from the vacuum flange 132. The plates 121B, ..., 121F separate the vacuum chamber 120 into partitions (e.g., a cryogenic partition 125), sub-partitions (e.g., an operational sub-partition 126), etc., such that the temperature inside the vacuum chamber at a level of a given plate is progressively lower as its separation from the vacuum flange 132 increases. For example, the vacuum chamber 120 includes helium pulse-tube cold heads 123 and a helium dilution unit 129 to maintain the first plate 121B at about 50K, the second plate 121C at about 4K, the third plate 121D at about 800 mK, the fourth plate 121E at about 100 mK, and the fifth plate 121E, on which the circuit of qubits of the quantum processor 110 is disposed, at temperatures less than 40 mK.

Referring again to FIG. 1A, note that the second electronic control module 112 is disposed inside the vacuum chamber 120, but outside the cryogenic partition 125, while the quantum processor 110 is disposed inside the cryogenic partition 125. Moreover, the quantum computing system 100 includes a cooling system 130a/b arranged such that components of the second electronic control module 112 are thermally coupled with the cooling system 130a/b. The cooling system 130a/b is configured to transfer to the ambient environment heat produced, during operation of the quantum computing system 100, by the components of the second electronic control module 112 inside the cryostat 105, as described below.

Figure 2A:
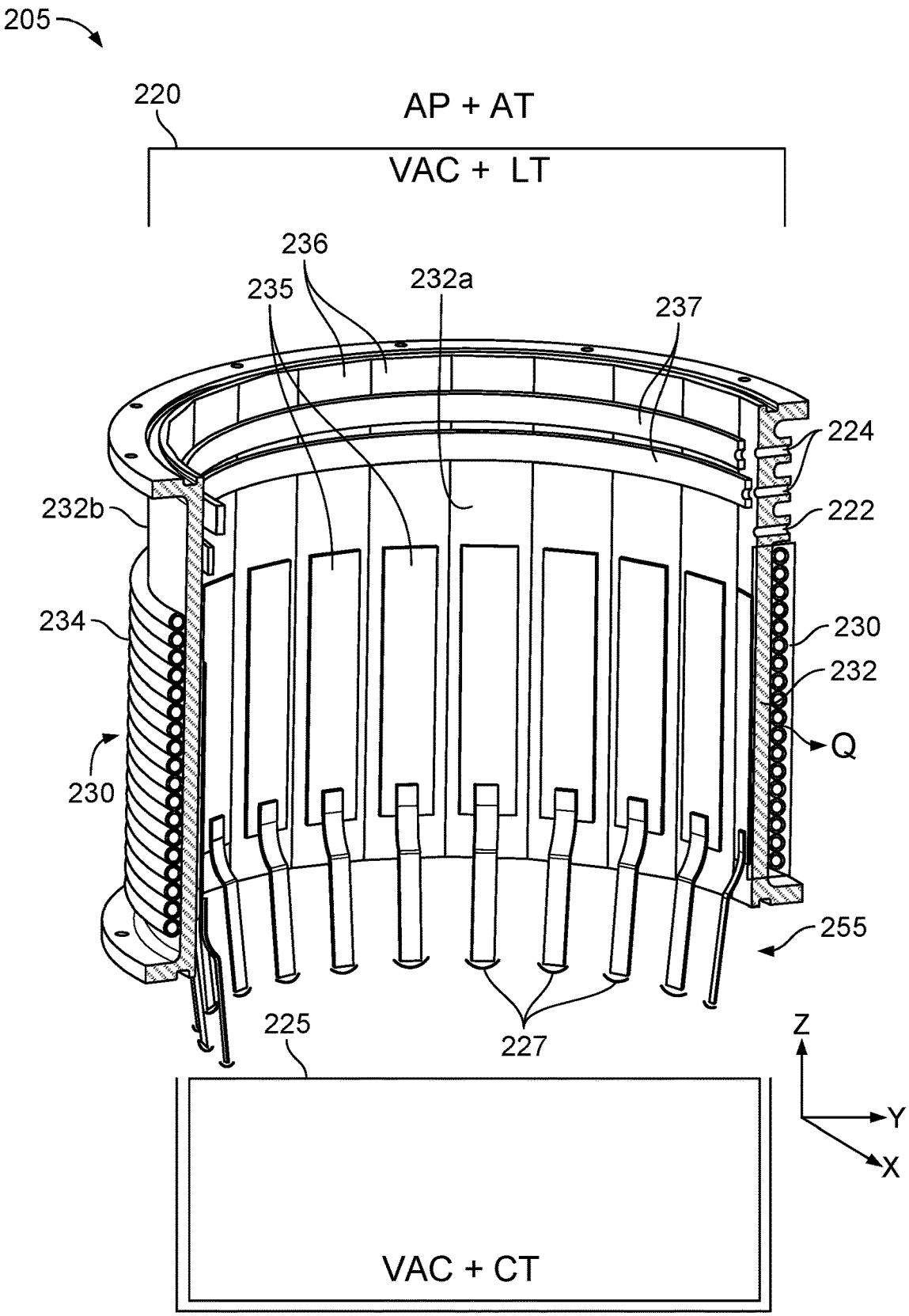
FIG. 2A is a perspective view of a cut-away of a section of a cryostat showing an example of a disposition of electronics on the cryostat's interior surface.
Figure 2B:
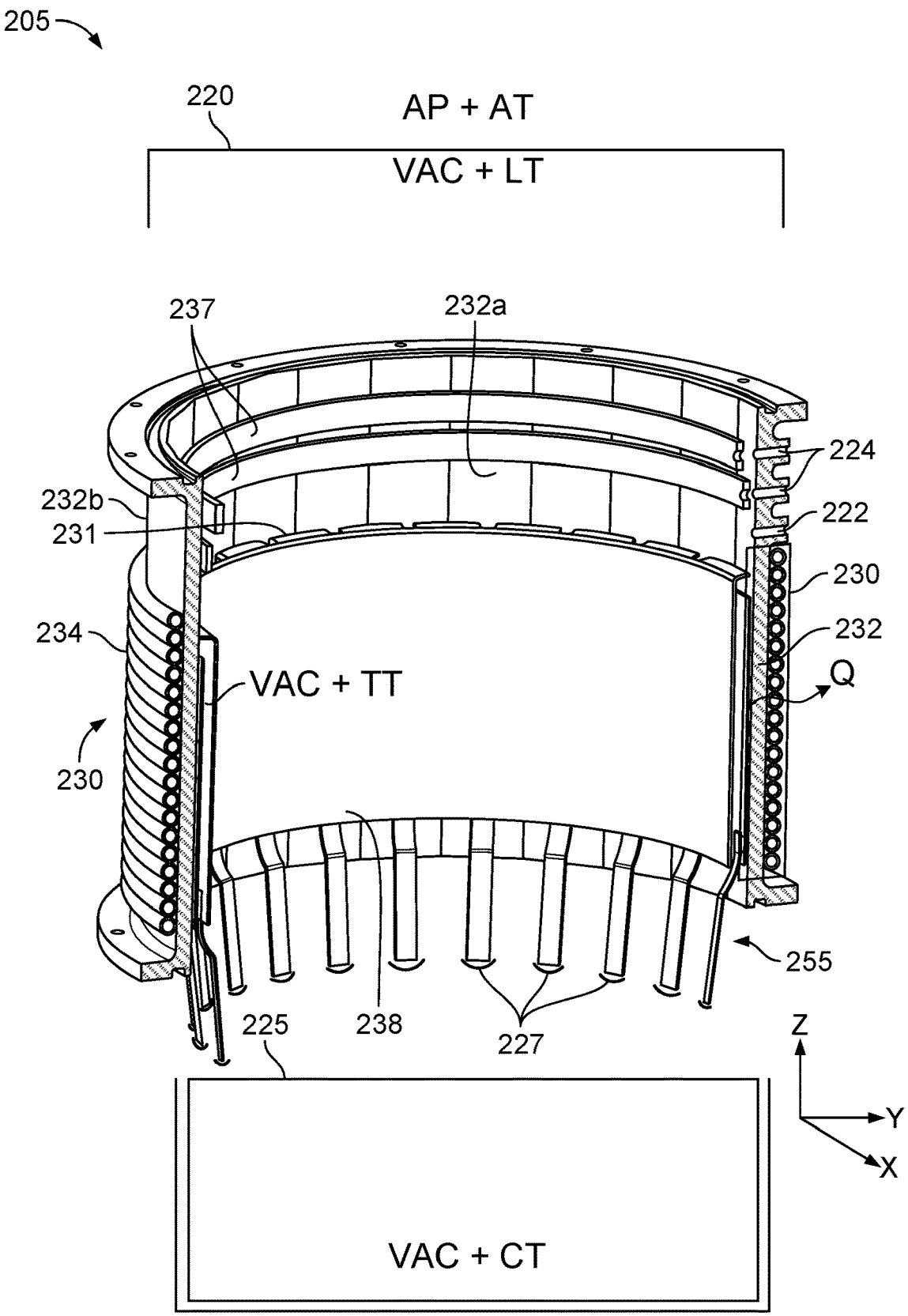
FIG. 2B is a perspective view of a cut-away of the section of the cryostat of FIG. 2A with the addition of a radiation shield.
Figure 2C:
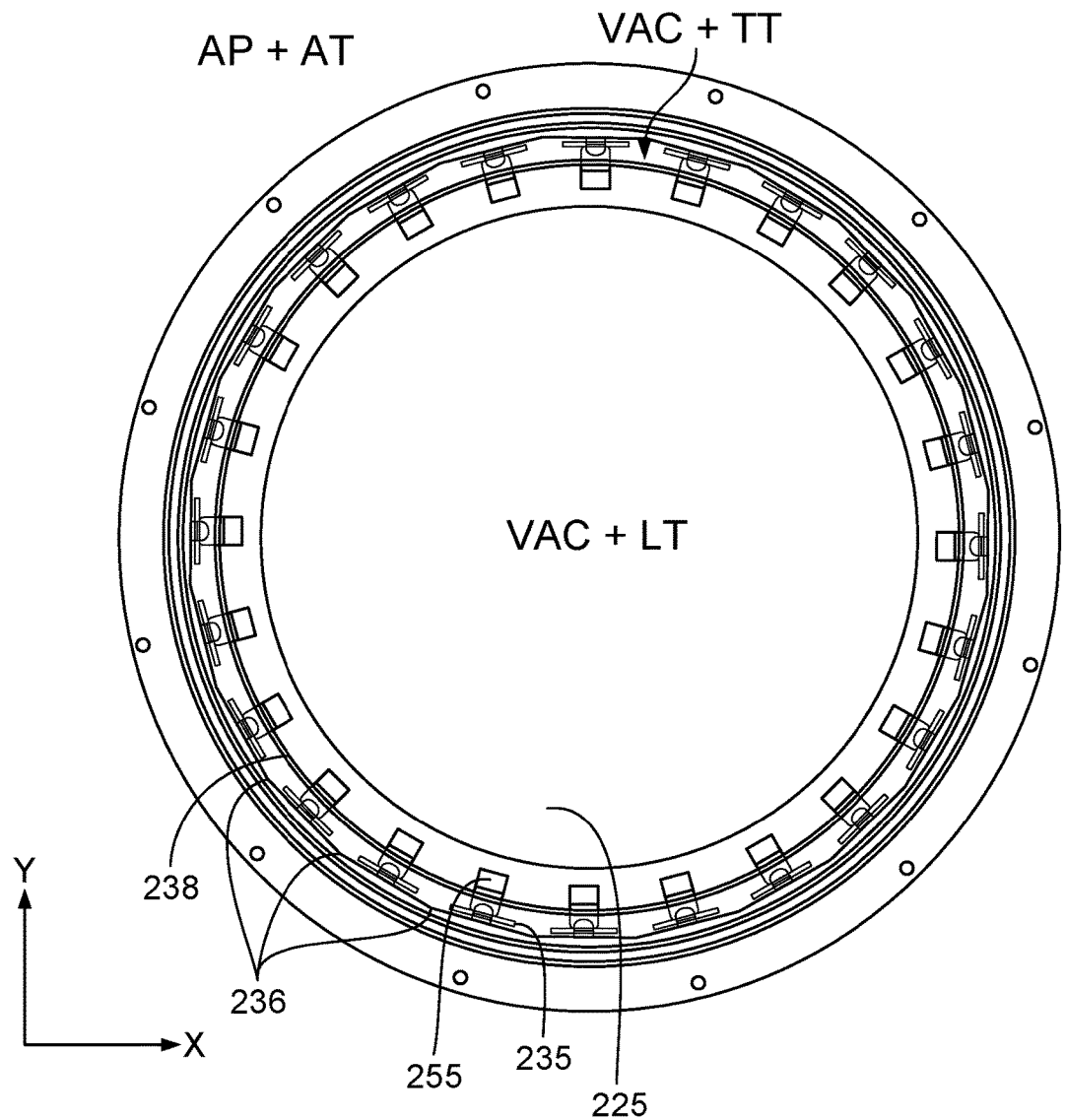
FIG. 2C is a top view of the section of the cryostat of FIG. 2B.

FIGS. 2A-2C show aspects of integration of an electronic control module (e.g., 112) disposed inside a cryostat 205 and supported on an inner wall surface 232a of the cryostat 205's wall 232. Here, a cooling system 230 includes the wall 232 of a vacuum chamber 220 of the cryostat 205, and a heat exchanger 234 thermally coupled to an outer wall surface 232b. In the examples illustrated in FIGS. 2A-2C, the inner wall surface 232a includes a plurality of planar facets 236. In this manner, the electronic control module (e.g., 112) is suitably implemented on one or more electronics boards 235 each mounted in thermal contact with a corresponding one of the planar facets 236. Various functions of the electronic control module (e.g., 112) can be implemented as application-specific integrated circuits (ASICs), field-programmable gate arrays FPGAs, or other integrated circuits (ICs) that are mounted on the electronics boards 235. One or more busbars 237, e.g., used for providing power to the electronic boards 235, are also mounted on the inner wall surface 232a, and the vacuum chamber 220 includes one or more electrical feedthroughs 224 corresponding to the one or more busbars 237. In this manner, power connectors (not shown) can provide power signals from outside the vacuum chamber 220 through the electrical feedthroughs 224 to the busbars 237 inside the vacuum chamber 220. The vacuum chamber 220 further includes an optical port 222 through which one or more optical transmission lines (e.g., 1≤k<<N instances of the optical transmission line 185) connects an electronic control module (e.g., 180) external to the vacuum chamber 220 with the electronic control module implemented on the electronics boards 235 internal to the vacuum chamber 220.

In the examples illustrated in FIGS. 2A-2C, the electronic boards 235 are connected with a quantum processor (e.g., 110) positioned in a cryogenic-temperature partition 225 of the cryostat 205 using flex lines 255. The flex lines 255 enter the cryogenic-temperature partition 225 through a MW port array 227.

In the examples illustrated in FIGS. 2B-2C, cooling system 230 suitably includes a radiation shield 238. The radiation shield 238 is disposed in the vacuum chamber 220 and spaced apart from the inner wall surface 232a to encompass the electronics boards 235, such that a temperature of the components of the electronic control module (e.g., 112) implemented on the electronics boards 235 encompassed by the radiation shield 238 is maintained within a target temperature range, TT~263-298K, higher than the low temperatures inside the vacuum chamber 220. Note that target temperature range TT is a useful temperature range for operating most commercial grade electronics. Lower temperatures could be used, but the electronics would need to be customized to handle the lower temperatures, and thus more expensive, at little if any expected advantage.

Multiple brackets 231 are used to mechanically and thermally attach the radiation shield 238 to the inner wall surface 232a. A size of the brackets along the radial direction of the vacuum chamber 220 ensures that the radiation shield 238 is spaced apart from the inner wall surface 232a by a desired separation. Note that the radiation shield 238 and the brackets 231 are made from a thermally conducting material, e.g., copper.

Figure 2D:
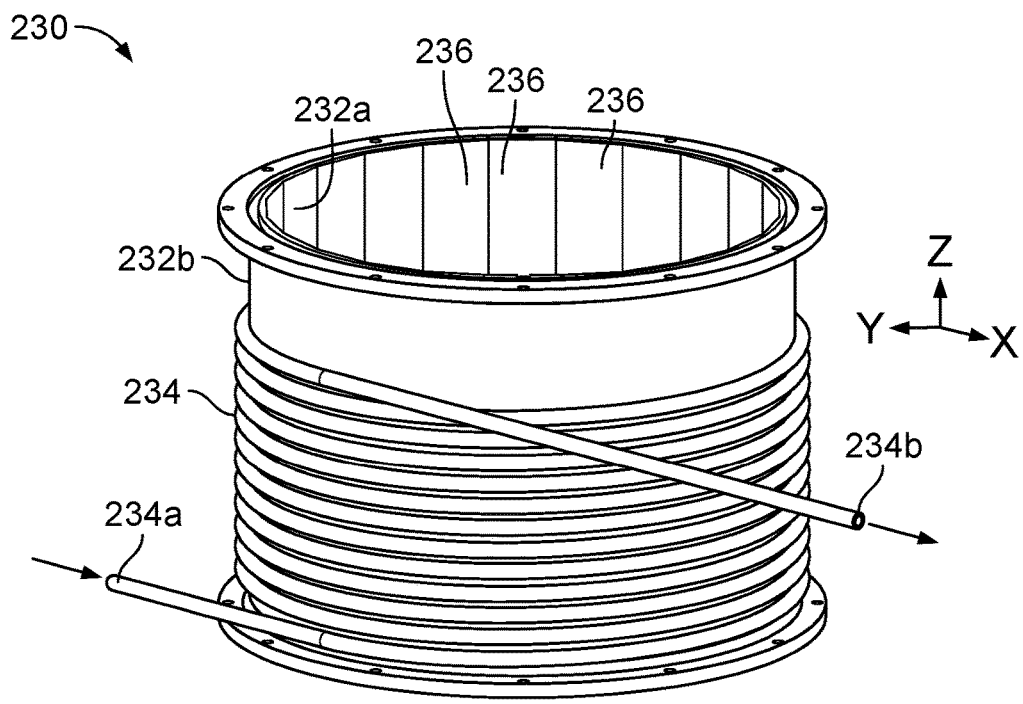
FIG. 2D shows an example of a liquid cooling system coupled with an outer surface of the cryostat's wall.

FIG. 2D shows an example of a cooling system 230 for which the heat exchanger 234 is implemented as a liquid-cooling loop in thermal contact with an outer wall surface 232b of the cryostat 205's wall 232. The liquid-cooling loop 234 is configured to receive cold liquid at an input end 234a, circulate the liquid around the wall 232 of the cryostat to extract heat produced by the electronic boards 235 attached to the planar facets 236 of the inner wall surface 232a, and dispose warm liquid at an output end 234b.

Figure 2E:
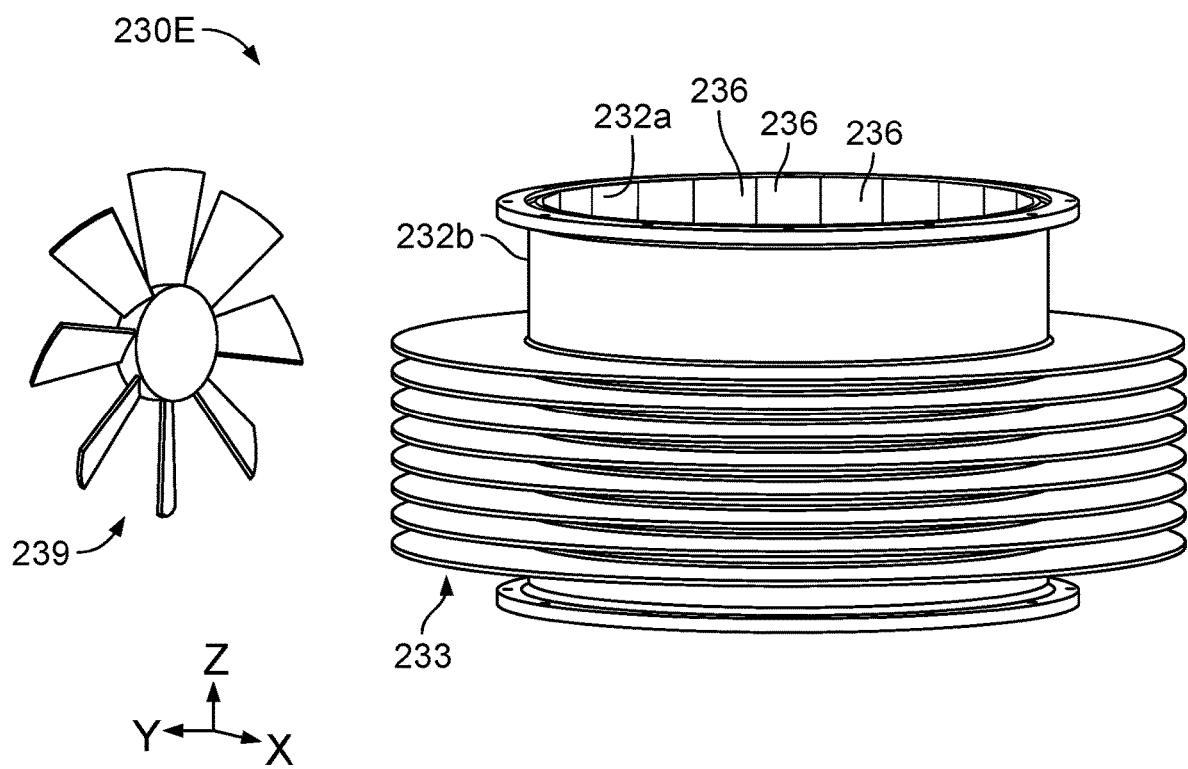
FIG. 2E shows an example of an air cooling system coupled with an outer surface of the cryostat's wall.

FIG. 2E shows another example of a cooling system 230E for which the heat exchanger is implemented as an air-cooling heat exchanger in the following manner. Here, the heat exchanger includes fins 233 arranged parallel to vacuum flange and plates of the vacuum chamber 220 (here, parallel to the (x,y)-plane; also see vacuum flange 121A and plates 121B ... 121F in FIG. 1B) and in thermal contact with the planar facets 236 of the outer wall surface 232b of the vacuum chamber 220's wall 232. Additionally, the heat exchanger includes one or more fans 239 arranged and configured to circulate air over the fins 233 to extract heat produced by the electronic boards 235 attached to the inner wall surface 232a.

Figure 3A:
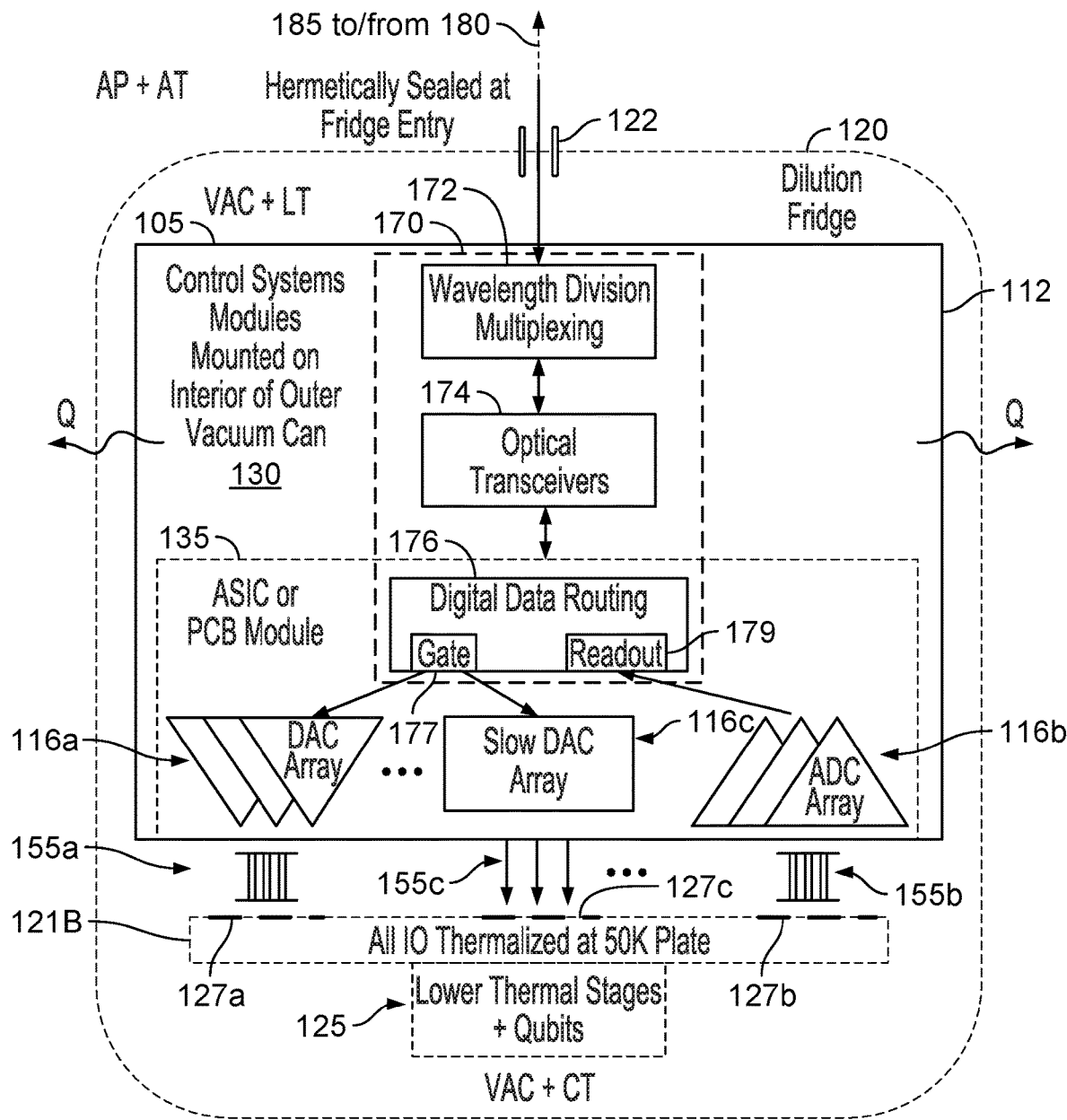
FIGS. 3A-3B show aspects of another example of a quantum computer system similar to the one illustrated in FIG. 1A.
Figure 3B:
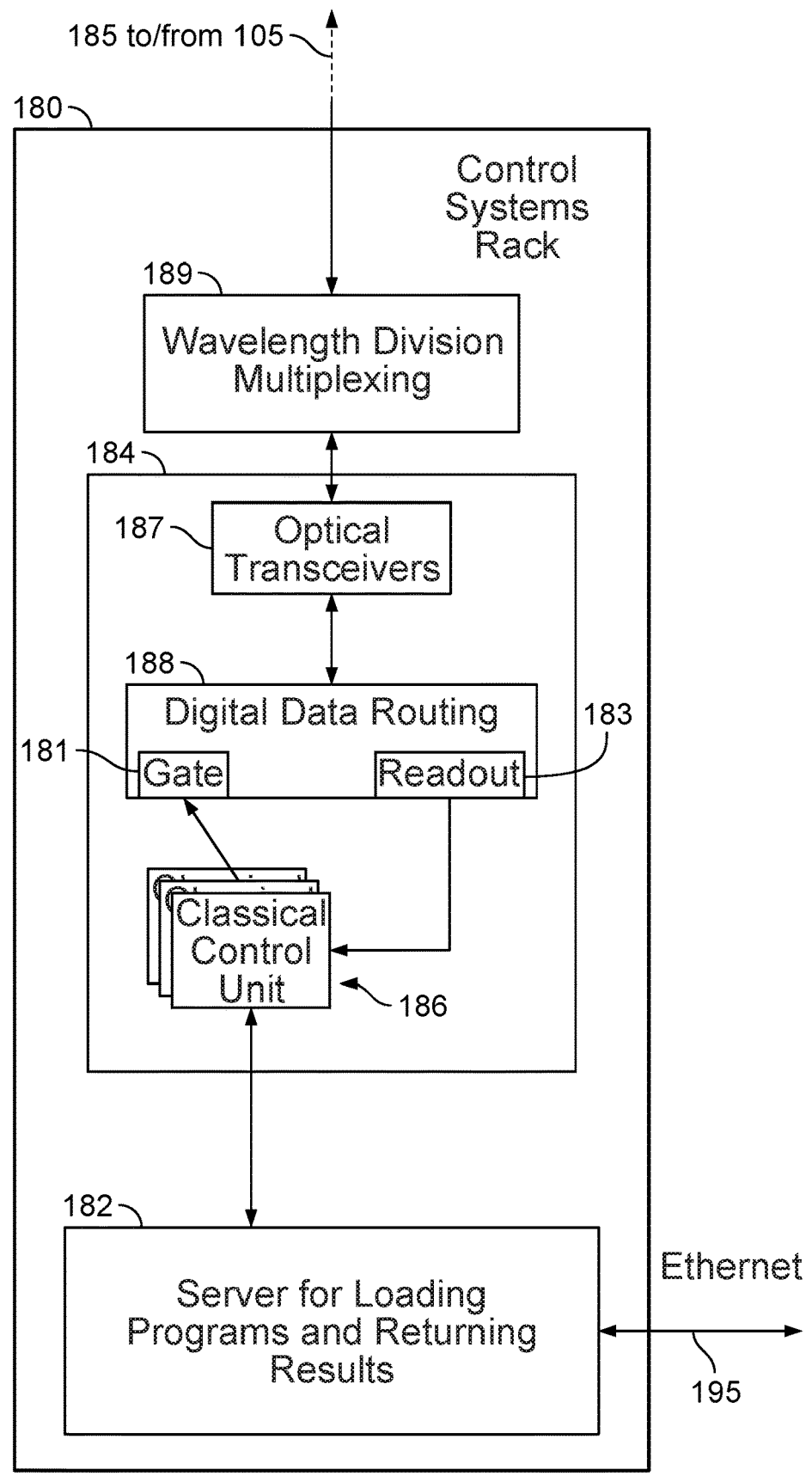

FIGS. 3A-3B show aspects of another example of the quantum computer system 100 which was described above in connection with FIGS. 1A-1B, 2A-2E. Functionality of the components described above will not be reiterated.

Referring now to FIG. 3A, the TX/RX & Router circuitry 170 includes wavelength division multiplexing circuitry 172, optical transceivers 174, and digital data routing circuitry 176. Here, the wavelength division multiplexing circuitry 172 is coupled with the first electronic control module 180 outside the vacuum chamber 120 using the single optical transmission line 185 through the optical port 122. The wavelength division multiplexing circuitry 172 is configured to de-multiplex digital control signals received through the single optical transmission line 185, and multiplex digital readout signals to be transmitted through the single optical transmission line 185.

Further here, the DAC/ADC circuitry is implemented as a DAC array 116a, a slow DAC array 116c, and an ADC array 116b. The DAC array 116a is configured to receive a first set of digital control signals from a gate-port array 177 of the digital data routing circuitry 176, convert the received signals to MW control signals, and provide the converted signals to the quantum processor 110. Note that the MW control signals are provided to the quantum processor 110 by the DAC array 116a using MW transmission lines 155a (e.g., implemented as flex) through a MW port array 127a. The slow DAC array 116c is configured to receive a second set of digital control signals from the gate-port array 177 of the digital data routing circuitry 176, convert the received signals to slow analog control signals (e.g., having frequencies spanning from DC to 300 MHz), and provide the converted signals to the quantum processor 110. Note that the slow analog control signals are provided to the quantum processor 110 by the DAC array 116c using analog transmission lines 155c (e.g., implemented as flex) through an analog-port array 127c. And the ADC array 116b is configured to receive MW readout signals from the quantum processor 110, convert the received signals to digital readout signals, and provide the converted signals to a readout-port array 179 of the digital data routing circuitry 176. Note that the MW readout signals are provided to the ADC array 116b by the quantum processor 110 using other MW transmission lines 155b (e.g., implemented as flex) through another MW port array 127b.

Referring now to FIG. 3B, the first electronic control module disposed outside of the cryostat is implemented here as a control system rack 180. In this example, the control system rack 180 includes a server 182 for loading programs and returning results, a digital signal processor (DSP) 184, and wavelength division multiplexing circuitry 189.

The server 182 for loading programs is configured to receive, using the network connection 195 from a job handler server (e.g., 190), code and/or instructions for a quantum calculation to be performed by the quantum computer system 100, and relay the same to the DSP 184. The server 182 for returning results is configured to receive, from the DSP 184, results of a quantum calculation performed by the quantum computer system 100 and relay the results to a job handler server (e.g., 190).

The DSP 184 includes multiple classical control units 186, digital data routing circuitry 188, and optical transceivers 189. Here, some of the classical control units 186 are configured to (i) use the code/instructions to produce a digital version of control signals for addressing qubits of the quantum processor 110, and (ii) provide the digital control signals to a gate port 181 of the digital data routing circuitry 188. Some of the classical control units 186 are configured to (i) receive digital versions of the quantum processor 110's readout signals from a readout port 183 of the digital data routing circuitry 188, (ii) parse the digital readout signals to extract results of quantum calculations performed by the quantum processor 110, and (iii) provide the results to the server 182 for returning results.

The wavelength division multiplexing circuitry 189 is coupled using the single optical transmission line 185 with the second electronic control module 112, which is inside the vacuum chamber 120. The wavelength division multiplexing circuitry 189 is configured to de-multiplex digital readout signals received through the single optical transmission line 185, and multiplex digital control signals to be transmitted through the single optical transmission line 185.

Figure 4:
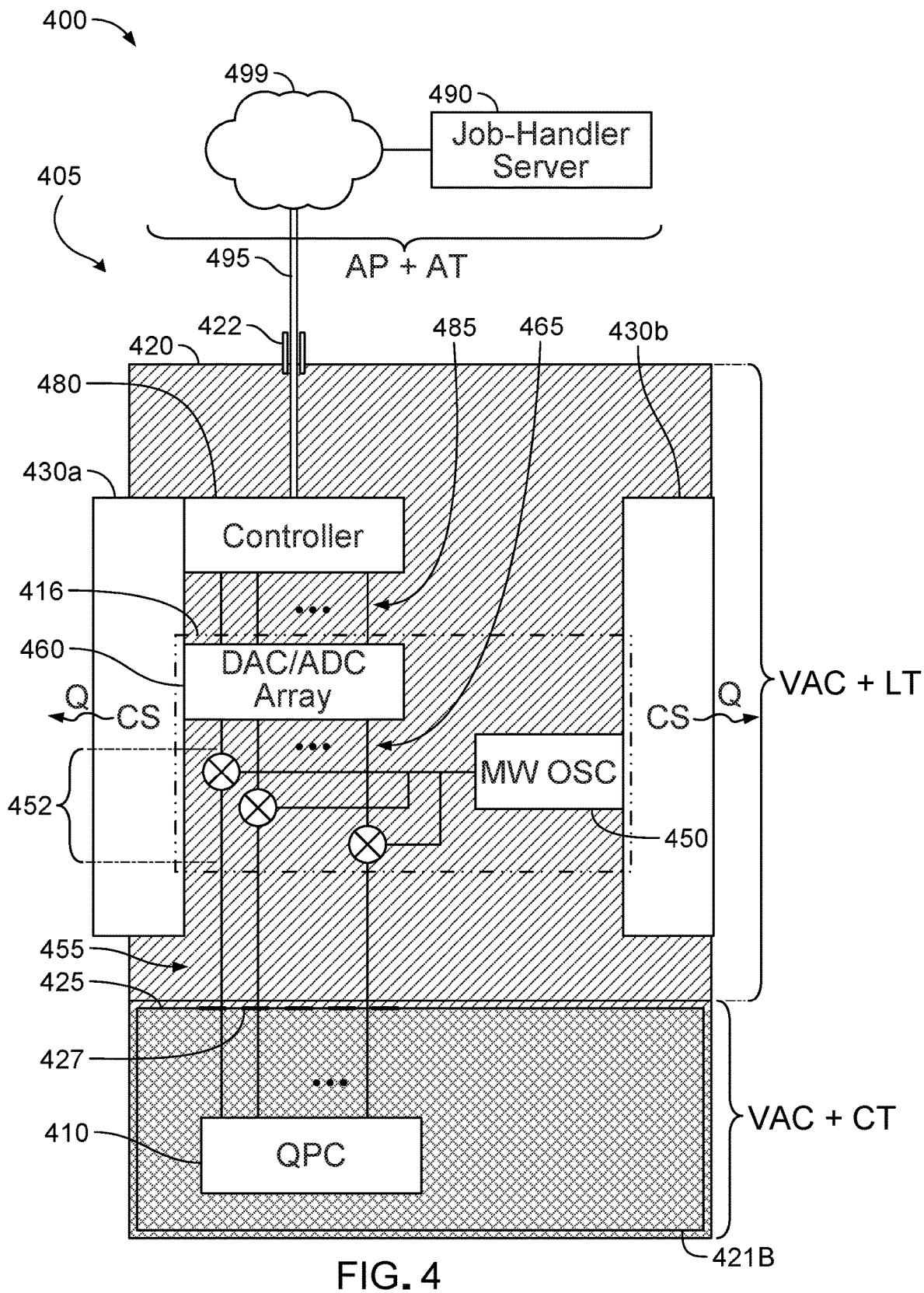
FIG. 4 shows a schematic representation of an example of a quantum computer system, which includes a cryostat, a quantum processor positioned in the cryostat, a first portion of controller circuitry disposed inside the cryostat to provide digital control signals, a second portion of the controller circuitry disposed inside the cryostat to provide analog control signals corresponding to the digital control signals, the first and second portions of the controller circuitry cooled to maintain a temperature closer to a temperature outside the cryostat than an operational temperature of the quantum processor, and multiple analog transmission lines through which the quantum processor receives the analog control signals.

FIG. 4 shows an example of a quantum computer system 400, which includes a cryostat 405, a quantum processor 410 positioned in the cryostat 405, a first portion of controller circuitry 480 (referred here, interchangeably, as controller) disposed inside the cryostat 405 to provide digital control signals, a second portion of the controller circuitry 416 (referred here, interchangeably, as DAC/ADC circuitry) disposed inside the cryostat 405 to provide analog control signals (at MW frequencies) corresponding to the digital control signals, the first and second portions of the controller circuitry cooled to a low temperature (LT~50-298K) or a target temperature (TT~263-298K) each closer to an ambient temperature (AT~298K) outside the cryostat 405 than an operational temperature (OT<40 mK) of the quantum processor 410, and multiple analog transmission lines 455 (here implemented as MW transmission lines) through which the quantum processor 410 receives the analog control signals.

The controller 480 is communicatively coupled with (i) the DAC/ADC circuitry 416, using digital transmission lines 485, and (ii) a job handler server 490 external to the cryostat 405, using a network connection through a network 499 (like either the Internet, or a private LAN/WAN). Here, the network connection is implemented as a single network cable 495 through a network port 422. Note that the term "a single network cable" 495 as used in this disclosure means one or more instances of the network cable 495, as explained above in connection with the definition of the term "single digital transmission line" 185.

Referring again to FIG. 4, the network port 422 is configured to allow the single network cable 495 traverse the vacuum jacket of the cryostat 405 from ambient temperature and pressure outside the cryostat 405 to low temperature (LT) and vacuum (VAC) inside the cryostat 405. In some implementations, the network port 422 is configured as a network-cable connector. In some implementations, the network port 422 is configured as a network-cable feedthrough.

The controller 480 is configured to (i) receive, from the job handler server 490, code/instructions for a quantum calculation to be performed by the quantum processor 410, (ii) produce a digital version of control signals for addressing qubits of the quantum processor 410, and (iii) provide the digital control signals to the DAC/ADC circuitry 416. The controller 480 is further configured to (i) receive, from the DAC/ADC circuitry 416, a digital version of the quantum processor 410's readout signals, (ii) parse the digital readout signals to extract results of the quantum calculation performed by the quantum processor 410, and (iii) provide the results to the job handler server 490.

The DAC/ADC circuitry 416 is connected with the quantum processor 410, using the multiple analog transmission lines 455 through an array of MW ports 427. The array of MW ports 427 is configured to allow the analog transmission lines 455 traverse at least one plate 421B of the cryostat 405 from low temperature outside a cryogenic-temperature partition 425 of the cryostat 405 to cryogenic temperature (CT) inside the cryogenic-temperature partition 425. In the example shown in FIG. 4, the DAC/ADC circuitry 416 includes a DAC/ADC array 460, a MW oscillator 450 and a mixer array 452. The mixer array 452 is connected to the DAC/ADC array 460 using analog connectors 465, and each of the mixers of the array 452 is connected to the MW oscillator 450. The DAC/ADC circuitry 416 is configured to (i) receive digital control signals, and (ii) convert the digital control signals to analog control signals at MW frequencies, and (iii) provide the MW control signals to the quantum processor 410. The DAC/ADC circuitry 416 is further configured to (i) receive analog readout signals at MW frequencies from the quantum processor 410, (ii) convert the MW readout signals to digital readout signals, and (iii) provide the digital readout signals to the controller 480.

In some implementations not shown in FIG. 4, the DAC/ADC circuitry lacks the DAC/ADC array 460. Here, the mixer array 452 is connected directly to the controller 480 through the analog connectors 465, so the multiple digital transmission lines 485 also are omitted. The controller 480 is configured to (i) produce an analog version of control signals for addressing qubits of the quantum processor 410, and (ii) provide the analog control signals to the mixer array 452. The controller 480 is further configured to (i) receive, from the mixer array 452, an analog version of the quantum processor 410's readout signals, and (ii) parse the analog readout signals to extract results of the quantum calculation performed by the quantum processor 410. The mixer array 452 is configured to (i) receive analog control signals, and (ii) convert, in conjunction with MW OSC 450, the analog control signals to MW control signals, and (iii) provide the MW control signals to the quantum processor 410. The mixer array 452 is further configured to (i) receive MW readout signals from the quantum processor 410, (ii) convert, in conjunction with MW OSC 450, the MW readout signals to analog readout signals, and (iii) provide the analog readout signals to the controller 480.

As described above in connection with FIG. 1B, the cryostat 405 includes a vacuum chamber 420 separated from the ambient environment through a wall. A plate 421B having a temperature of about 50K defines the above-noted cryogenic partition 425 of the vacuum chamber 420 which hosts the quantum processor 410. However, note that each of the controller 480 and the DAC/ADC circuitry 416 is disposed inside the vacuum chamber 420, but outside the cryogenic partition 425. Moreover, the quantum computing system 400 includes a cooling system 430a/b arranged such that components of the controller 480 and components of the DAC/ADC circuitry 416 are thermally coupled with the cooling system 430a/b. The cooling system 430a/b is configured to transfer to the ambient environment heat produced, during operation of the quantum computing system 400, by the components of the controller 480 and the components of the DAC/ADC circuitry 416 inside the cryostat 405, as described above in connection with FIGS. 2A-2E.

Figure 5A:
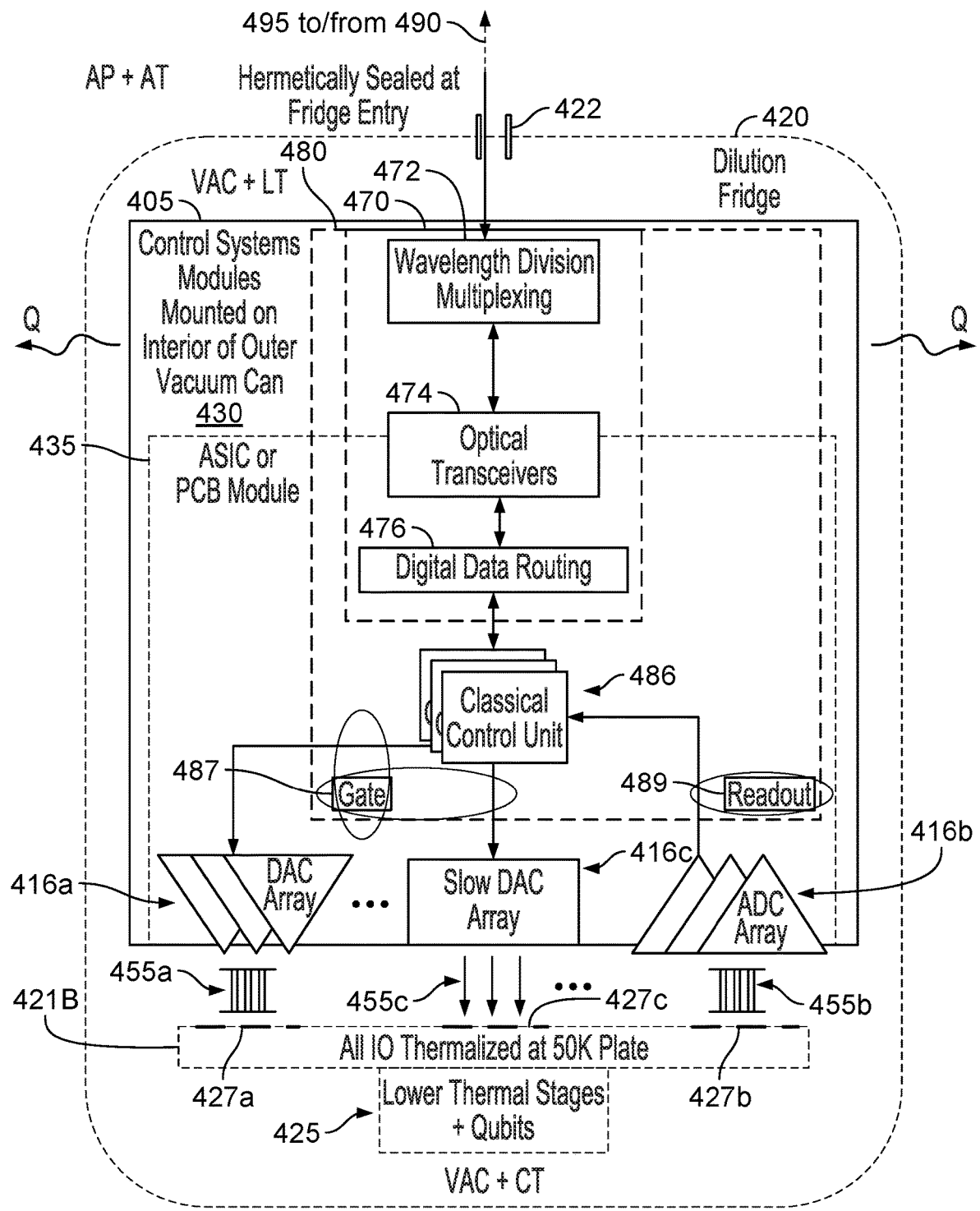
FIGS. 5A-5B show aspects of another example of a quantum computer system similar to the one illustrated in FIG. 4.
Figure 5B:
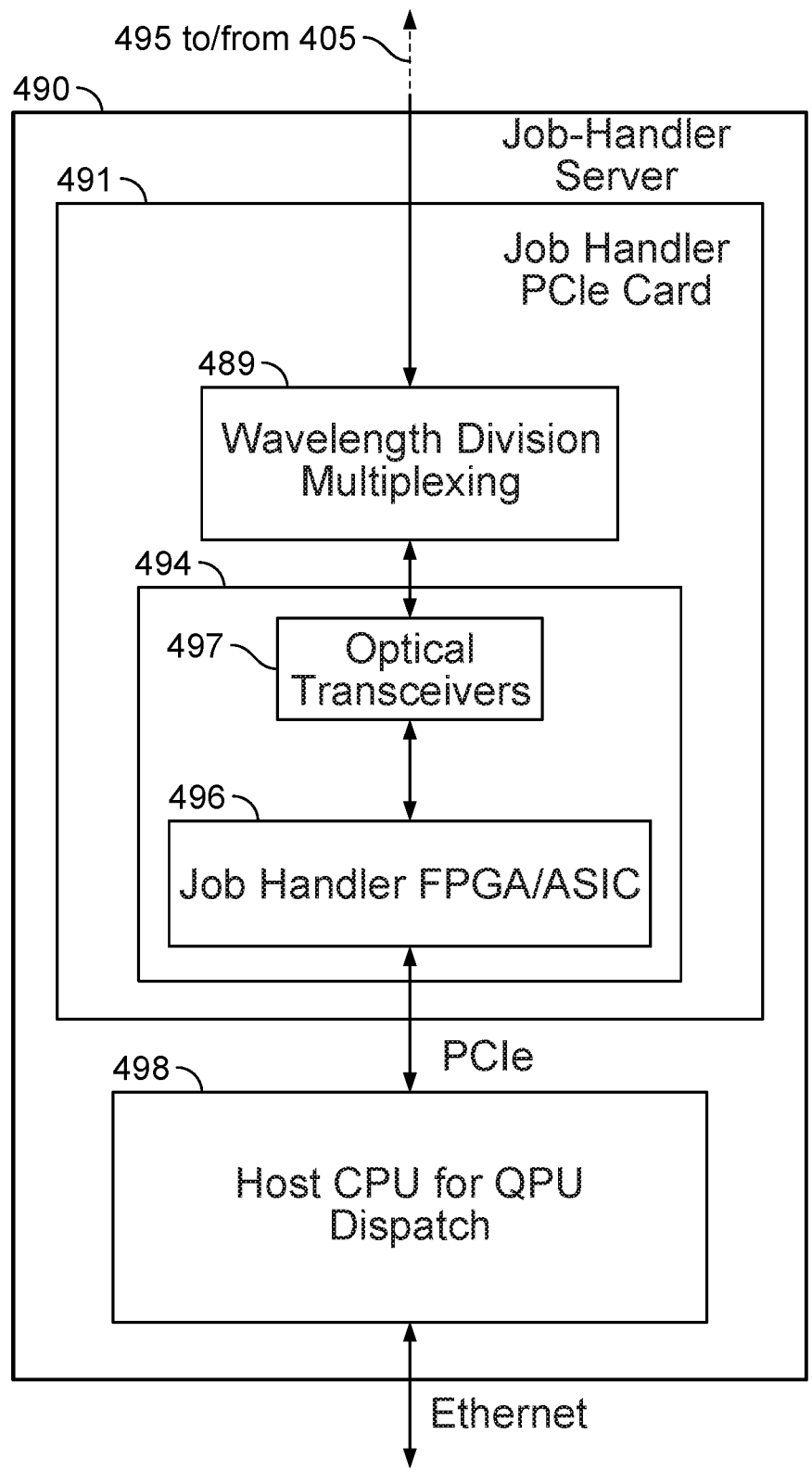

FIGS. 5A-5B show aspects of another example of the quantum computer 400 which was described above in connection with FIGS. 1B, 2A-2E, 4. Functionality of the components similar to the functionality described above will not be reiterated.

Referring now to FIG. 5A, the controller 480 includes TX/RX & Router circuitry 470, and multiple classical control units 486. The TX/RX & Router circuitry 470 is coupled, inside the vacuum chamber 420, with the multiple classical control units 486, and, outside the vacuum chamber, with job handler server 490. The connection with the job handler server 490 uses the single network cable 495 through the network port 422. The TX/RX & Router circuitry 470 is configured to (i) receive from the job handler server 490, multiplexed network packets which carry code/instructions for a quantum calculation to be performed by the quantum processor 410, (ii) de-multiplex the network packets, and (iii) route the code/instructions from the data packets to the appropriate ones of the classical control units 486. The TX/RX & Router circuitry 470 is further configured to (i) receive results of the quantum calculation performed by the quantum processor 410 from various ones of the classical control units 486, (ii) produce network packets carrying the results, and (iii) multiplex the network packets and transmit the multiplexed network packets to the job handler server 490.

Here, the DAC/ADC circuitry is implemented as a DAC array 416a, a slow DAC array 116c, and an ADC array 116b. The DAC array 116a is configured to receive a first set of digital control signals from a gate-port array 487 of the classical control units 486, convert the received signals to MW control signals, and provide the converted signals to the quantum processor 410. The slow DAC array 416c is configured to receive a second set of digital control signals from the gate-port array 487 of the classical control units 486, convert the received signals to slow analog control signals (e.g., having frequencies spanning from DC to 300 MHz), and provide the converted signals to the quantum processor 410. And the ADC array 416b is configured to receive MW readout signals from the quantum processor 410, convert the received signals to digital readout signals, and provide the converted signals to a readout-port array 489 of the classical control units 486.

Further here, some of the classical control units 486 are configured to (i) use the code/instructions received from the TX/RX & Router circuitry 470 to produce a digital version of control signals for addressing qubits of the quantum processor 410, and (ii) provide the digital control signals to the DAC array 416a or the slow DAC array 116c. Some of the classical control units 486 are configured to (i) receive digital versions of the quantum processor 410's readout signals from the ADC array 416b, (ii) parse the digital readout signals to extract results of quantum calculations performed by the quantum processor 410, and (iii) provide the results to the TX/RX & Router circuitry 470.

Referring now to FIG. 5B, the job handler server 490 includes a job handler peripheral component interconnect express (PCIe) card 491 and a host classical processing unit (CPU) 498 for quantum processing unit (QPU) dispatch, where herein QPU refers to the control electronics of FIG. 5A and the QPC. The job handler PCIe card 491 includes wavelength division multiplexing circuitry 489 and a digital signal processor (DSP) 494. The wavelength division multiplexing circuitry 489 is coupled using the single network cable 195 with the controller 480, which is inside the vacuum chamber 420.

The DSP 494 includes optical transceivers 497 and a job handler FPGA/ASIC 496. The job handler FPGA/ASIC 496 is communicatively coupled with the host CPU 498 for QPU dispatch using a PCIe connection. Components of the job handler server 490 are configured to obtain code/instructions for a quantum calculation to be performed by the quantum processor 410 disposed in the vacuum chamber, load the code/instructions into network packets, multiplex network packets, and transmit the multiplexed network packets to the controller 480, which is inside the vacuum chamber 420. Components of the job handler server 490 are further configured to receive, from the controller 480, which is inside the vacuum chamber 420, multiplexed network packets carrying results of quantum calculations performed by the quantum processor 410 disposed in the vacuum chamber, de-multiplex the network packets and extract the results from payloads of the network packets, and provide the results for storage, display, etc.

Figure 6:
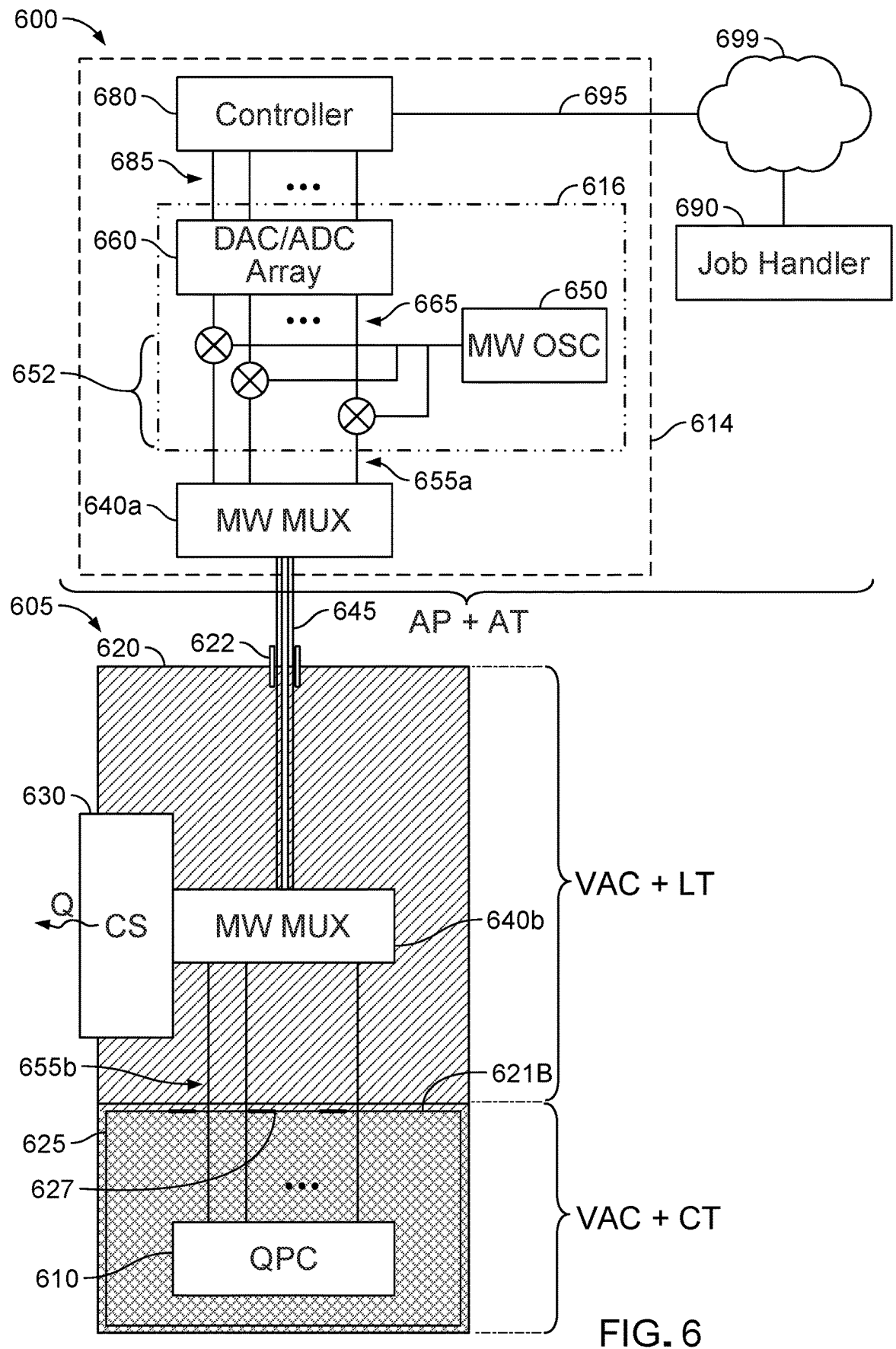
FIG. 6 shows a schematic representation of an example of a quantum computer system, which includes a cryostat, a quantum processor positioned in the cryostat, a first portion of controller circuitry disposed outside the cryostat to provide multiplexed analog control signals, a single analog transmission line passing through a vacuum seal of the cryostat, a second portion of the controller circuitry disposed inside the cryostat to de-multiplex the analog control signals received through the single analog transmission line, the second portion of the controller circuitry cooled to maintain a temperature closer to a temperature outside the cryostat than an operational temperature of the quantum processor, and multiple analog transmission lines through which the quantum processor receives the analog control signals.

FIG. 6 shows an example of a quantum computer system 600, which includes a cryostat 605, a quantum processor 610 positioned in the cryostat 605, a first portion of controller circuitry 614 (referred interchangeably as electronic control module) disposed outside the cryostat 605 to provide multiplexed analog control signals (at MW frequencies), a single analog transmission line 645 (e.g., a MW transmission line) passing through a vacuum seal of the cryostat 605, a second portion of the controller circuitry 640b (referred to interchangeably as an internal MW-signal multiplexer/de-multiplexer (MUX/deMUX)) disposed inside the cryostat 605 to de-multiplex the analog control signals received through the single analog transmission line 645, the internal MW-signal MUX/deMUX cooled to a low temperature (LT~50-298K) closer to an ambient temperature (AT~298K) outside the cryostat 605 than an operational temperature (OT<40 mK)

of the quantum processor 610, and multiple analog transmission lines 655*b* through which the quantum processor 610 receives the analog control signals.

The electronic control module 614 includes a controller 680, DAC/ADC circuitry 616, and an external MW-signal MUX/deMUX 640*a*.

The controller 680 is communicatively coupled with (i) the DAC/ADC circuitry 616, using digital transmission lines 685, and (ii) a job handler server 690 external to the cryostat 605, using a network connection through a network 699 (like either the Internet, or a private LAN/WAN). Here, the network connection is implemented as a single network cable 695. The controller 680 is configured to (i) receive, from the job handler server 690, code/instructions for a quantum calculation to be performed by the quantum processor 610, (ii) produce a digital version of control signals for addressing qubits of the quantum processor 610, and (iii) provide the digital control signals to the DAC/ADC circuitry 616. The controller 680 is further configured to (i) receive, from the DAC/ADC circuitry 616, a digital version of the quantum processor 610's readout signals, (ii) parse the digital readout signals to extract results of the quantum calculation performed by the quantum processor 610, and (iii) provide the results to the job handler server 690.

The DAC/ADC circuitry 616 is connected to the external MW-signal MUX/deMUX 640*a*, using multiple external analog transmission lines 655*a*. In the example shown in FIG. 6, the DAC/ADC circuitry 616 includes a DAC/ADC array 660, a MW oscillator 650 and a mixer array 652. The mixer array 652 is connected to the DAC/ADC array 660 using analog connectors 665, and each of the mixers of the array 652 is connected to the MW oscillator 650. The DAC/ADC circuitry 616 is configured to (i) receive digital control signals, and (ii) convert the digital control signals to analog control signals at MW frequencies, and (iii) provide the MW control signals to the external MW-signal MUX/deMUX 640*a*. The DAC/ADC circuitry 616 is further configured to (i) receive analog readout signals at MW frequencies from the external MW-signal MUX/deMUX 640*a*, (ii) convert the MW readout signals to digital readout signals, and (iii) provide the digital readout signals to the controller 680.

The external MW-signal MUX/deMUX 640*a* is coupled with the internal MW-signal MUX/deMUX 640*b* using the single MW transmission line 645 through a MW port 622. The MW port 622 is configured to allow the single MW transmission line 645 traverse the vacuum jacket of the cryostat 605 from ambient temperature and pressure outside the cryostat 605 to low temperature (LT) and vacuum (VAC) inside the cryostat 605. The external MW-signal MUX/deMUX 640*a* is configured to (i) receive, from the DAC/ADC circuitry 616, the MW control signals, and (ii) multiplex them and provide the multiplexed MW control signals to the internal MW-signal MUX/deMUX 640*b*. The external MW-signal MUX/deMUX 640*a* is further configured to (i) receive multiplexed MW readout signals from the internal MW-signal MUX/deMUX 640*b*, and (ii) de-multiplex them and provide the MW readout signals to the DAC/ADC circuitry 616.

The internal MW-signal MUX/deMUX 640*b* is connected with the quantum processor 610, using the multiple internal analog transmission lines 655*b* through an array of MW ports 627. The array of MW ports 627 is configured to allow the internal analog transmission lines 655*b* traverse at least one plate 621B of the cryostat 605 from low temperature outside a cryogenic-temperature partition 625 of the cryostat 605 to cryogenic temperature (CT) inside the cryogenic-temperature partition 625. The internal MW-signal MUX/deMUX 640*b* is configured to (i) receive multiplexed MW control signals from the external MW-signal MUX/deMUX 640*a*, and (ii) de-multiplex them and provide the MW control signals to the quantum processor 610. The internal MW-signal MUX/deMUX 640*b* is further configured to (i) receive, from the quantum processor 610, the MW readout signals, and (ii) multiplex them and provide the multiplexed MW readout signals to the external MW-signal MUX/deMUX 640*a*.

As described above in connection with FIG. 1B, the cryostat 605 includes a vacuum chamber 620 separated from the ambient environment through a wall. A plate 621B having a temperature of about 50K defines the above-noted cryogenic partition 625 of the vacuum chamber 620 which hosts the quantum processor 610. However, note that internal MW-signal MUX/deMUX 640*b* is disposed inside the vacuum chamber 620, but outside the cryogenic partition 625. Moreover, the quantum computing system 600 includes a cooling system 630 arranged such that components of the internal MW-signal MUX/deMUX 640*b* are thermally coupled with the cooling system 630. The cooling system 630 is configured to transfer to the ambient environment heat produced, during operation of the quantum computing system 600, by the components of the internal MW-signal MUX/deMUX 640*b* inside the cryostat 605, as described above in connection with FIGS. 2A-2E.

In view of the above details, in a first innovative aspect described herein in connection with FIGS. 1A, 2A-2E and 3A-3B, optical signals are provided through the vacuum shield of a cryostat hosting a superconducting quantum computer processor (or, simply, a quantum processor), and microwave signals corresponding to the optical signals are provided to the quantum processor. The first general innovative aspect can be implemented as a quantum computing system (100) which includes a cryostat (105) having a vacuum chamber (120). The cryostat (105) is configured to support a low-temperature vacuum environment during operation of the quantum computing system (100). The quantum computing system (100) further includes a superconducting quantum computer processor (110) positioned in the vacuum chamber (120); a first electronic control module (180) external to the vacuum chamber (120); a second electronic control module (112) within the vacuum chamber (120); and at least one optical transmission line (185) connecting the first electronic control module (180) external to the vacuum chamber (120) with the second electronic control module (112) internal to the vacuum chamber (120). The optical transmission line (185) is configured to transmit optical signals to and from the second electronic control module (112) during operation of the quantum computing system (100). Additionally, the quantum computing system (100) includes a plurality of signal lines (155, 155*a*, 155*b*, 155*c*) connecting the second electronic control module (112) with the superconducting quantum computer processor (110). A first subset of the signal lines (155, 155*a*, 155*b*) is configured to transmit microwave signals to and from the superconducting quantum computer processor (110) during operation of the quantum computing system (100).

The foregoing and other embodiments can each optionally include one or more of the following features, alone or in combination. In some implementations, the signal lines (155, 155*a*, 155*b*) of the first subset are configured to transmit the microwave signals having frequencies between 300 MHz and 300 GHz. In some cases, the signal lines (155, 155*a*, 155*b*) of the first subset can transmit the microwave signals having frequencies less than 20 GHz. For instance, the signal lines (155, 155a, 155b) of the first subset transmit the microwave signals having frequencies less than 10 GHz.

In some implementations, a second subset of the signal lines (155c) is configured to transmit slow electrical signals in a frequency range between DC and 300 MHz to the superconducting quantum computer processor (110) during operation of the quantum computing system (100).

In a second innovative aspect described herein in connection with FIGS. 1A, 2A-2E and 3A-3B, digital signals are provided through the vacuum shield of a cryostat hosting a quantum processor, and analog signals corresponding to the digital signals are provided to the quantum processor by a converter positioned inside the vacuum shield of the cryostat. The second general innovative aspect can be implemented as a quantum computing system (100) which includes a cryostat (105) having a vacuum chamber (120). The cryostat (105) is configured to support a low-temperature vacuum environment during operation of the quantum computing system (100). The quantum computing system (100) further includes a superconducting quantum computer processor (110) positioned in the vacuum chamber (120); a first electronic control module (180) external to the vacuum chamber (120); and a second electronic control module (112) within the vacuum chamber (120). The second electronic control module (112) includes one or more digital-to-analog converters (116) configured to receive digital signals and provide analog signals based on the digital signals during operation of the quantum computing system (100). Furthermore, the quantum computing system (100) includes at least one transmission line (185) connecting the first electronic control module (180) external to the vacuum chamber (120) with the second electronic control module (112) internal to the vacuum chamber (120). The transmission line (185) is configured to transmit digital signals to and from the second electronic control module (112) during operation of the quantum computing system (100). Additionally, the quantum computing system (100) includes a plurality of signal lines (155) connecting the second electronic control module (112) with the superconducting quantum computer processor (110). The signal lines (155) are configured to transmit analog signals to the superconducting quantum computer processor (110) during operation of the quantum computing system (100).

The foregoing and other embodiments can each optionally include one or more of the following features, alone or in combination. In some implementations, the transmission line (185) can be an optical transmission line. In some implementations of the quantum computing system (100) in accordance with either the first aspect or the second aspect, the second electronic control module (112) can include a de-multiplexing module (170) for receiving a multiplexed optical signal from the optical transmission line (185) and providing de-multiplexed optical signals for producing corresponding microwave signals to the signal lines (155).

In a third innovative aspect described herein in connection with FIGS. 1A, 2A-2E and 3A-3B, multiplexed optical signals are provided through the vacuum shield of a cryostat hosting a quantum processor, and the optical signals are de-multiplexed, by a de-multiplexer positioned inside the vacuum shield of the cryostat, and used to produce signals for the quantum processor. The third general innovative aspect can be implemented as a quantum computing system (100) which includes a cryostat (105) having a vacuum chamber (120). The cryostat (105) is configured to support a low-temperature vacuum environment during operation of the quantum computing system (100). The quantum computing system (100) further includes a superconducting quantum computer processor (110) positioned in the vacuum chamber (120); a first electronic control module (180) external to the vacuum chamber (120); and a second electronic control module (112) within the vacuum chamber (120). The second electronic control module (112) includes a signal de-multiplexer (170). Furthermore, the quantum computing system (100) includes an optical transmission line (185) connecting the first electronic control module (180) external to the vacuum chamber (120) with the second electronic control module (112) internal to the vacuum chamber (120). The optical transmission line (185) is configured to transmit multiplexed optical signals to and from the second electronic control module (112) during operation of the quantum computing system (100). Additionally, the quantum computing system (100) includes a plurality of signal lines (155) connecting the second electronic control module (112) with the superconducting quantum computer processor (110). The signal lines (155) are configured to transmit corresponding de-multiplexed signals to, and corresponding signals from, the superconducting quantum computer processor (110) during operation of the quantum computing system (100).

The foregoing and other embodiments can each optionally include one or more of the following features, alone or in combination. In some implementations of the quantum computing system (100) in accordance with any one of the first, second and third aspects, the vacuum chamber (120) can include at least one optical port (122, 222) through which the optical transmission line (185) connects the first electronic control module (180) external to the vacuum chamber (120) with the second electronic control module (112) internal to the vacuum chamber (120).

In a fourth innovative aspect described herein in connection with FIGS. 2A-2E, 4 and 5A-5B, network packets are provided through the vacuum shield of a cryostat hosting a quantum processor, digital signals corresponding to the network packets are provided by a controller to a converter each positioned inside the vacuum shield of the cryostat, and analog signals corresponding to the digital signals are provided by the converter to the quantum processor. The fourth general innovative aspect can be implemented as a quantum computing system (400) which includes a cryostat (405) having a vacuum chamber (420). The cryostat (405) is configured to support a low-temperature vacuum environment during operation of the quantum computing system (400). The quantum computing system (400) further includes a superconducting quantum computer processor (410) positioned in the vacuum chamber (420); and a controller (480) within the vacuum chamber (420). The controller (480) is configured to produce digital control signals for, and process digital readout signals of, the superconducting quantum computer processor (410). Furthermore, the quantum computing system (400) includes one or more converters (416) within the vacuum chamber (420). The one or more converters (416) are configured to (i) receive the digital control signals and provide analog control signals based on the received digital control signals, and (ii) receive analog readout signals and provide the digital readout signals based on the received analog readout signals. Also, the quantum computing system (400) includes at least one network cable (495) connecting the controller (480) internal to the vacuum chamber (420) with a job-handler server (490) external to the cryostat (405). The network cable (495) is configured to transmit, through a network 499, network packets to and from the controller (480) during operation of the quantum computing system (400). Additionally, the quantum computing system (400) includes a plurality of signal lines (455) connecting the one or more converters (416) with the superconducting quantum computer processor (410). The signal lines (455) are configured to transmit analog signals to the superconducting quantum computer processor (410) during operation of the quantum computing system (400).

The foregoing and other embodiments can each optionally include one or more of the following features, alone or in combination. In some implementations, the vacuum chamber (420) can include at least one network port (422) through which the network cable (495) connects the controller (480) internal to the vacuum chamber (420) with the job-handler server (490) external to the cryostat (405).

In some implementations of the quantum computing system (100, 400) in accordance with any one of the first, second, third and fourth aspects, the second electronic control module (112, 480/416) can include a DAC/ADC array (160, 460) to receive digital signals from, and produce digital signals for transmission to, the first electronic control module (180, 490) external to the cryostat (105, 405); a mixer array (152, 452) to receive MW signals from, and produce MW signals for transmission to, the superconducting quantum computer processor (110, 410); and a MW oscillator (150, 450) operatively coupled with (i) the mixer array (152, 452) to produce the MW signals for transmission to the superconducting quantum computer processor (110, 410, 610), and (ii) the DAC/ADC array (160, 460) to produce the digital signals for transmission to the first electronic control module (180, 490) external to the cryostat (105, 405).

In other implementations of the quantum computing system (100, 400) in accordance with any one of the first, second, third and fourth aspects, the second electronic control module (112, 480/416) can include a DAC/ADC array (116a/116b, 416a/416b) to (i) receive digital signals from, and produce digital signals for transmission to, the first electronic control module (180, 490) external to the cryostat (105, 405), and (ii) receive MW signals from, and produce MW signals for transmission to, the superconducting quantum computer processor (110, 410). Note that the latter implementations of the second electronic control module (112, 480/416) do not include a MW oscillator nor a mixer array. Here, the oscillator function is suitably handled by the DAC/ADC array (116a/116b, 416a/416b) directly, because the DAC/ADC arrays (116a/116b, 416a/416b) can be switched at microwave frequency.

In a fifth innovative aspect described herein in connection with FIGS. 2A-2E and 6, multiplexed microwave signals are provided through the vacuum shield of a cryostat hosting a quantum processor, and the microwave signals are de-multiplexed, by a de-multiplexer positioned inside the vacuum shield of the cryostat and cooled to a temperature closer to the temperature outside the cryostat than an operational temperature of the quantum processor, before the microwave signals are provided to the quantum processor. The fifth general innovative aspect can be implemented as a quantum computing system (600) which includes a cryostat (605) having a vacuum chamber (620). The cryostat (605) is configured to support, during operation of the quantum computing system (600), a cryogenic-temperature vacuum environment in a cryogenic-temperature partition (625) of the vacuum chamber (620). Temperatures inside the vacuum chamber (620) are higher outside, than inside, the cryogenic-temperature partition (625). The quantum computing system (600) further includes a superconducting quantum processor (610) positioned in the cryogenic-temperature partition (625) of the vacuum chamber (620); an electronic control module (614) external to the cryostat (605); and a MW-signal multiplexer/de-multiplexer (MUX/deMUX) (640b) within the vacuum chamber (620) and outside the cryogenic-temperature partition (625) thereof. The MW-signal MUX/deMUX (140b) is arranged in thermal contact with an inner wall surface (232a) of a wall (232) of the vacuum chamber (620). Furthermore, the quantum computing system (600) includes a MW-transmission line (645) connecting the electronic control module (614) external to the cryostat (605) with the MW-signal MUX/deMUX (640b) internal to the vacuum chamber (620) outside its cryogenic-temperature partition (625). The MW-transmission line (645) is configured to transmit multiplexed MW signals to and from the MW-signal MUX/deMUX (640b) during operation of the quantum computing system (600). Additionally, the quantum computing system (600) includes a plurality of signal lines (655) connecting the MW-signal MUX/deMUX (640b) internal to the vacuum chamber (620) outside its cryogenic-temperature partition (625) with the superconducting quantum computer processor (610) internal to the cryogenic-temperature partition (625) of the vacuum chamber (620). The signal lines (655) are configured to transmit corresponding de-multiplexed MW signals to, and corresponding MW signals from, the superconducting quantum computer processor (610) during operation of the quantum computing system (600).

The foregoing and other embodiments can each optionally include one or more of the following features, alone or in combination. In some implementations, the vacuum chamber (620) can include a MW port (622) through which the MW-transmission line (645) connects the MW-signal MUX/deMUX (640b) internal to the vacuum chamber (620) with the electronic control module (614) external to the cryostat (605).

In some implementations, the quantum computing system (100, 400, 600) in accordance with any one of the first, second, third, fourth and fifth aspects can include one or more busbars (237) coupled with an inner wall surface (232a) of a wall (232) of the vacuum chamber (120, 220, 420, 620). Here, the vacuum chamber (120, 220, 420, 620) can include one or more electrical feedthroughs (224) corresponding to the one or more busbars (237).

In some implementations, the quantum computing system (100, 400, 600) in accordance with any one of the first, second, third, fourth and fifth aspects can include flexible circuits including the signal lines (155, 255, 455, 655).

In some implementations of the quantum computing system (100, 400, 600) in accordance with any one of the first, second, third, fourth and fifth aspects, the cryostat (105, 205, 405, 605) can be a helium dilution refrigerator.

In some implementations of the quantum computing system (100, 400, 600) in accordance with any one of the first, second, third, fourth and fifth aspects, the superconducting quantum computer processor (110, 410, 610) and the second electronic control module (112, 480/416, 640b) can be separated within the vacuum chamber (120, 420, 620) by one or more baffles.

In some implementations of the quantum computing system (100, 400, 600) in accordance with any one of the first, second, third, fourth and fifth aspects, the second electronic control module (112, 480/416, 640b) can include one or more components that produce heat during operation, and the one or more components are thermally coupled to an inner wall surface (232a) of a wall (232) of the vacuum chamber (120, 420, 620). In some of these cases, the inner wall surface (232a) can include a plurality of planar facets (236). Here, the second electronic control module (112,

480/416, 640b) can include one or more electronics boards (235) each mounted in thermal contact with a corresponding one of the planar facets (236).

In some implementations, the quantum computing system (100, 400, 600) in accordance with any one of the first, second, third, fourth and fifth aspects can include a cooling system (130, 130a/b, 230, 230C, 430a/b, 630) having a wall (232) of the vacuum chamber (120, 220, 420, 620). Here, the wall (232) has an inner wall surface (232a) and an outer wall surface (232b).

Additionally, the cooling system (CS) (130, 130a/b, 230, 230C, 430a/b, 630) can have a heat exchanger thermally coupled to the outer wall surface (232b). Components of the second electronic control module (112, 480/416, 640b) are thermally coupled to the inner wall surface (232a), such that the cooling system (130, 230, 430a/b, 630) removes, during operation of the quantum computing system (100, 400, 600), at least a portion of heat produced by the components of the second electronic control module (112, 480/416, 640b). Note that removed heat, Q, is illustrated in each of FIGS. 1A, 3A, 4, 5A and 6. Here, the cooling system (230) can include a radiation shield (238). The radiation shield (238) is disposed in the vacuum chamber (120, 220, 420, 620) and spaced apart from the inner wall surface (232a) to encompass the components of the second electronic control module (112, 480/416, 640b), such that a temperature of the components of the second electronic control module (112, 480/416, 640b) encompassed by the radiation shield (238) is maintained within a target temperature range higher than cryogenic temperatures. One key advantage of feature is that the temperature of the electronics (112, 480/416, 640b) mounted to the cooling system (130, 130a/b, 230, 230C, 430a/b, 630) will be able to be specifically controlled and held at a stable value, not just arbitrarily cooled. In some cases, the target temperature range is 298K to 263K. Note that this is a useful temperature range for operating most commercial grade electronics. Lower temperatures could be used, but the electronics would need to be customized to handle the lower temperatures, and thus more expensive, at little if any expected advantage. In some implementations of the cooling system (230), the heat exchanger can include a liquid-cooling loop (234). In other implementations of the cooling system (230E), the heat exchanger can include (i) fins (233) disposed on the outer wall surface (232b), and (ii) one or more fans (239) to circulate air over the fins (233).

In some implementations of the quantum computing system (100, 400, 600) in accordance with any one of the first, second, third, fourth and fifth aspects, the vacuum chamber (120, 220, 420, 620) can support, during operation of the quantum computing system (100, 400, 600), a cryogenic-temperature vacuum environment in a cryogenic-temperature partition (125, 225, 425, 625) of the vacuum chamber (120, 220, 420, 620). Temperatures inside the vacuum chamber (120, 220, 420, 620) are higher outside, than inside, the cryogenic-temperature partition (125, 225, 425, 625). Here, the superconducting quantum computer processor (110, 410, 610) is positioned in the cryogenic-temperature partition (125, 225, 425, 625) of the vacuum chamber (120, 220, 420, 620). Additionally, the second electronic control module (112, 480/416, 640b) is positioned within the vacuum chamber (120, 220, 420, 620) and outside the cryogenic-temperature partition (125, 225, 425, 625) thereof. The second electronic control module (112, 480/416, 640b) is arranged in thermal contact with an inner wall surface (232a) of a wall (232) of the vacuum chamber (120, 220, 420, 620). In some of these cases, the temperature inside the cryogenic-temperature partition (125, 225, 425, 625) is lower than 50K. Moreover, the cryogenic-temperature partition (125, 225, 425, 625) of the vacuum chamber (120, 220, 420, 620) has an operational-temperature sub-partition (126). The temperature inside the operational-temperature sub-partition (126) is lower than 100 mK. Further, the cryogenic-temperature partition (125, 225, 425, 625) can include an array of MW ports (127, 227, 427, 627) through which the signal lines (155, 255, 455, 655) connect the second electronic control module (112, 480/416, 640b) with the superconducting quantum computer processor (110, 410, 610). Furthermore, input/output (IO) signal lines can be thermalized at one or more of the temperature sub-partitions. For example, each of FIGS. 3A and 5A shows thermalization of IO signal lines at 50K plates 121B and 421B, respectively.

In conclusion, the disclosed technologies for integrating a control rack and a cryostat can be used advantageously for scaling a number of superconducting qubits hosted by the cryostat without having to increase the number of RF connections between the control rack and the cryostat. This will allow the disclosed control rack and cryostat integration to be used as a template for how 100-1000 qubit systems are built. In this manner, the disclosed configurations of control electronics integration within a cryostat provide a platform for further developing low-latency feedback from classical electronics to a circuit of superconducting qubits.

Further improvements to the disclosed technologies include using the thermal stages of the cryostat to cool the electronics further and improve the temperature stability even more.

Moreover, while the foregoing examples feature quantum computers that use superconducting quits, more generally, the innovations described herein can be applied to quantum computers that use other types of qubits as well. For example, electron spin qubits, photon polarization qubits, quantum dot qubits, atomic spin qubits, nuclear spin qubits, ion trap qubits, nitrogen vacancy qubits, photonic qubits, etc. can be used. Furthermore, ion trap systems and photonic qubit systems generally may benefit from being housed in chambers, including environmental chambers and vacuum chambers, to provide temperature stability, in some embodiments to control ambient gas composition, and in some embodiments to control other environmental factors that affect the system performance, providing a stable environment for operation. The innovations described herein can be applied to quantum computers that include such chambers, including environmental chambers and vacuum chambers as described herein. In certain systems, cryogenic environments are not necessary for operation. For instance, some systems can operate at Room Temperature.

In some instances, all or part of the quantum processing unit functions as a quantum processor, a quantum memory, or another type of subsystem. In some examples, the quantum processing unit includes a quantum circuit system. The quantum circuit system may include qubit devices, readout devices and possibly other devices that are used to store and process quantum information. In some cases, the quantum processing unit includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processing unit. In some cases, the quantum processing unit includes an ion trap system, and the qubit devices are implemented as trapped ions controlled by optical signals delivered to the quantum processing unit. In some cases, the quantum processing unit includes a spin system, and the qubit devices are implemented as nuclear or electron spins controlled by microwave or radio-frequency signals delivered to the quantum processing unit. The quantum processing unit may be implemented based on another physical modality of quantum computing.

Furthermore, while the foregoing examples utilize RF signals, more generally the innovations described herein can be applied to other signals too. For instance, embodiments can feature high-bandwidth pulses that are not sinusoidal RF pulses, such as adiabatic CZ style pulses. Generally, the high bandwidth signals can be sinusoidal signals or have non-sinusoidal signals (e.g., square, triangular, sawtooth or other waveforms).

In some implementations, the first and second electronic control modules are connected by other signal lines in addition to the optical transmission lines. For example, in certain cases, non-optical signals (e.g., RF signals) can be generated outside of the stable environment chamber housing the quantum processor and fed through to electronics inside the chamber along with optical transmission lines carrying the multiplexed optical signals. Generally, the additional transmission line or transmission lines can carry multiplexed or non-multiplexed signals.

While the foregoing embodiments feature signal lines to the quantum computer processor from only the second electronic control module, other implementations are possible. For example, the quantum computer processor can also receive one or more signal lines that bypass the second electronic control module. In some embodiments, the quantum computer processor can be connected to the first electronic control module or to another external electronic control module via one or more direct signal lines that bypass any electronic control modules that are inside the chamber.

A number of embodiments are described. Other embodiments are in the following claims.

What is claimed is:

1. A quantum computing system, comprising:
    a cryostat comprising a vacuum chamber, the cryostat being configured to support a low-temperature vacuum environment during operation of the quantum computing system;
    a quantum computer processor positioned in the vacuum chamber;
    a first electronic control module external to the vacuum chamber;
    a second electronic control module within the vacuum chamber;
    an optical transmission line connecting the first electronic control module external to the vacuum chamber with the second electronic control module internal to the vacuum chamber, the optical transmission line being configured to transmit optical signals to and from the second electronic control module during operation of the quantum computing system; and
    a plurality of signal lines connecting the second electronic control module with the quantum computer processor, a first subset of the signal lines being configured to transmit microwave signals to and from the quantum computer processor during operation of the quantum computing system.

2. A The quantum computing system of claim 1, wherein the second electronic control module comprises one or more digital-to-analog converters configured to receive digital signals and provide analog signals based on the digital signals during operation of the quantum computing system.

3. The quantum computing system of claim 1, wherein the second electronic control module comprises a de-multiplexing module for receiving a multiplexed optical signal from the optical transmission line and providing de-multiplexed optical signals for producing corresponding microwave signals to the signal lines.

4. The quantum computing system of claim 1, wherein the vacuum chamber comprises an optical port through which the optical transmission line connects the first electronic control module external to the vacuum chamber with the second electronic control module internal to the vacuum chamber.

5. The quantum computing system of claim 1, wherein the second electronic control module comprises
    a DAC/ADC array to receive digital signals from, and produce digital signals for transmission to, the first electronic control module external to the cryostat,
    a mixer array to receive MW signals from, and produce MW signals for transmission to, the quantum computer processor, and
    a MW oscillator operatively coupled with
        the mixer array to produce the MW signals for transmission to the quantum computer processor, and
        the DAC/ADC array to produce the digital signals for transmission to the first electronic control module external to the cryostat.

6. The quantum computing system of claim 1, wherein the second electronic control module comprises
    a DAC/ADC array to
        receive digital signals from, and produce digital signals for transmission to, the first electronic control module external to the cryostat, and
        receive MW signals from, and produce MW signals for transmission to, the quantum computer processor.

7. The quantum computing system of claim 1, comprising:
    one or more busbars coupled with the inner wall surface of the wall of the vacuum chamber,
    wherein the vacuum chamber comprises one or more electrical feedthroughs corresponding to the one or more busbars.

8. The quantum computing system of claim 1, wherein the quantum computer processor and the second electronic control module are separated within the vacuum chamber by one or more baffles.

9. The quantum computing system of claim 1 wherein the quantum computer processor is a superconducting circuit quantum computer processor.

10. The quantum computing system of claim 1, wherein the second electronic control module comprises one or more components that produce heat during operation, and the one or more components are thermally coupled to an inner wall surface of a wall of the vacuum chamber.

11. The quantum computing system of claim 10, wherein an inner wall surface comprises a plurality of planar facets.

12. The quantum computing system of claim 11, wherein the second electronic control module comprises one or more electronics boards each mounted in thermal contact with a corresponding one of the planar facets.

13. The quantum computing system of claim 1, further comprising
    a cooling system comprising
        a wall of the vacuum chamber, the wall having an inner wall surface and an outer wall surface, and
        a heat exchanger thermally coupled to the outer wall surface, wherein components of the second electronic control module are thermally coupled to the inner wall surface, such that the cooling system removes, during operation of the quantum computing system, at least a portion of heat produced by the components of the second electronic control module.

14. The quantum computing system of claim 13, wherein the cooling system comprises a radiation shield, the radiation shield being disposed in the vacuum chamber and spaced apart from the inner wall surface to encompass the components of the second electronic control module, such that a temperature of the components of the second electronic control module encompassed by the radiation shield is maintained within a target temperature range higher than cryogenic temperatures.

15. The quantum computing system of claim 14, wherein the target temperature range is 298K to 263K.

16. The quantum computing system of claim 1, wherein
the vacuum chamber is configured to support, during operation of the quantum computing system, a cryogenic-temperature vacuum environment in a cryogenic-temperature partition of the vacuum chamber, wherein temperatures inside the vacuum chamber are higher outside, than inside, the cryogenic-temperature partition,
the quantum computer processor is positioned in the cryogenic-temperature partition of the vacuum chamber, and
the second electronic control module is positioned within the vacuum chamber and outside the cryogenic-temperature partition thereof, the second electronic control module being arranged in thermal contact with an inner wall of the vacuum chamber.

17. The quantum computing system of claim 16, wherein the temperature inside the cryogenic-temperature partition is lower than 50K.

18. The quantum computing system of claim 16, wherein the cryogenic-temperature partition of the vacuum chamber has an operational-temperature sub-partition.

19. The quantum computing system of claim 18, wherein the temperature inside the operational-temperature sub-partition is lower than 100 mK.

20. The quantum computing system of claim 1, wherein the optical transmission line is the only transmission line connecting the first electronic control module external to the vacuum chamber with the second electronic control module internal to the vacuum chamber.

21. The quantum computing system of claim 1, further comprising at least one direct signal line connecting the first electronic control module to the quantum computer processor, the at least one direct signal line bypassing the second control module.

22. The quantum computing system of claim 1, wherein the transmission line is one of a plurality of transmission lines connecting the first electronic control module external to the chamber with the second electronic control module internal to the chamber.

23. The quantum computing system of claim 22, wherein the quantum computer processor comprises N total qubits and the plurality of transmission lines includes a total of k transmission lines, where N>>k.

24. A quantum computing system, comprising:
a cryostat comprising a vacuum chamber, the cryostat being configured to support a low-temperature vacuum environment during operation of the quantum computing system;
a quantum computer processor positioned in the vacuum chamber;
a first electronic control module external to the vacuum chamber;
a second electronic control module within the vacuum chamber comprising a signal de-multiplexer;
an optical transmission line connecting the first electronic control module external to the vacuum chamber with the second electronic control module internal to the vacuum chamber, the optical transmission line being configured to transmit multiplexed optical signals to and from the second electronic control module during operation of the quantum computing system; and
a plurality of signal lines connecting the second electronic control module with the quantum computer processor, the signal lines being configured to transmit corresponding de-multiplexed signals to, and corresponding signals from, the quantum computer processor during operation of the quantum computing system.

25. A quantum computing system, comprising:
a cryostat comprising a vacuum chamber, the cryostat being configured to support, during operation of the quantum computing system, a low-temperature vacuum environment;
a quantum computer processor positioned in the vacuum chamber;
a controller within the vacuum chamber, the controller configured to produce digital control signals for, and process digital readout signals of, the quantum computer processor;
one or more converters within the vacuum chamber, the one or more converters configured to
receive the digital control signals and provide analog control signals based on the received digital control signals, and
receive analog readout signals and provide the digital readout signals based on the received analog readout signals;
a network cable connecting the controller internal to the vacuum chamber with a job-handler server external to the cryostat, the network cable being configured to transmit, through a network, network packets to and from the controller during operation of the quantum computing system; and
a plurality of signal lines connecting the one or more converters with the quantum computer processor, the signal lines being configured to transmit analog signals to the quantum computer processor during operation of the quantum computing system.

26. The quantum computing system of claim 25, wherein the vacuum chamber comprises a network port through which the network cable connects the controller internal to the vacuum chamber with the job-handler server external to the cryostat.

* * * * *